(12) United States Patent
Rasmussen et al.

(10) Patent No.: US 8,014,946 B2
(45) Date of Patent: Sep. 6, 2011

(54) DIGITAL MAPPING SYSTEM

(75) Inventors: Jens Eilstrup Rasmussen, San Francisco, CA (US); Lars Eilstrup Rasmussen, Fairlight (AU); Bret Steven Taylor, Los Gatos, CA (US); James Christopher Norris, Mountain View, CA (US); Stephen Ma, Kingsford (AU); Andrew Robert Kirmse, Emerald Hills, CA (US); Noel Phillip Gordon, Hunters Hill (AU); Seth Michael LaForge, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/027,984

(22) Filed: Feb. 15, 2011

(65) Prior Publication Data

US 2011/0137766 A1   Jun. 9, 2011

Related U.S. Application Data

(60) Division of application No. 12/766,077, filed on Apr. 23, 2010, now Pat. No. 7,894,984, which is a division of application No. 12/127,815, filed on May 27, 2008, now abandoned, which is a continuation of application No. 11/567,054, filed on Dec. 5, 2006, now Pat. No. 7,379,811, which is a continuation of application No. 11/051,534, filed on Feb. 5, 2005, now Pat. No. 7,158,878.

(60) Provisional application No. 60/567,946, filed on May 3, 2004, provisional application No. 60/555,501, filed on Mar. 23, 2004.

(51) Int. Cl.
*G01C 21/30* (2006.01)
(52) U.S. Cl. ............... 701/208; 340/995.14; 340/995.18
(58) Field of Classification Search .......... 701/207–213; 340/995.1–995.14
See application file for complete search history.

(56) References Cited

U.S. PATENT DOCUMENTS

| 6,522,336 | B1 * | 2/2003 | Yuasa ........................... 345/582 |
| 7,542,882 | B2 * | 6/2009 | Agrawala et al. ................. 703/2 |
| 7,565,240 | B2 * | 7/2009 | Tomizawa ..................... 701/202 |
| 7,826,472 | B2 * | 11/2010 | Kappes et al. ................ 370/445 |

* cited by examiner

*Primary Examiner* — Richard M. Camby
(74) *Attorney, Agent, or Firm* — Fenwick & West LLP

(57) ABSTRACT

Various methods, systems, and apparatus for implementing aspects of a digital mapping system are disclosed. One such method includes sending a location request from a client-side computing device to a map tile server, receiving a set of map tiles in response to the location request, assembling said received map tiles into a tile grid, aligning the tile grid relative to a clipping shape, and displaying the result as a map image. One apparatus according to aspects of the present invention includes means for sending a location request from a client-side computing device to a map tile server, means for receiving a set of map tiles in response to the location request, means for assembling said received map tiles into a tile grid, means for aligning the tile grid relative to a clipping shape, and means for displaying the result as a map image. Such an apparatus may further include direction control or zoom control objects as interactive overlays on the displayed map image, and may also include route or location overlays on the map image.

10 Claims, 30 Drawing Sheets

1) <img src="screen_tile.gif" width="128" height="128">

2) <img src="print_tile.gif" width="512" height="512">

3) <img src="print_tile.gif" width="128" height="128">

DIGITAL MAPPING SYSTEM

CROSS-REFERENCE TO RELATED APPLICATIONS

This application is a divisional of U.S. application Ser. No. 12/766,077 filed on Apr. 23, 2010 now U.S. Pat. No. 7,894,984, which is a divisional of U.S. patent application Ser. No. 12/127,815 filed on May 27, 2008 now abandoned, which is a continuation of U.S. patent application Ser. No. 11/567,054 filed on Dec. 5, 2006 now U.S. Pat. No. 7,379,811, which is a continuation of U.S. patent application Ser. No. 11/051,534, filed on Feb. 5, 2005 now U.S. Pat. No. 7,158,878 and entitled "Digital Mapping System", which claims priority of U.S. Provisional Patent Application No. 60/567,946, filed May 3, 2004, and U.S. Provisional Patent Application No. 60/555,501, filed Mar. 23, 2004, where the entirety of each of said applications is hereby incorporated herein by reference.

BACKGROUND

1. Field of the Invention

Implementations consistent with the principles of the invention relate generally to mapping systems, and more specifically, to mapping systems in a digital environment.

2. Description of Related Art

Computerized mapping systems have been developed for facilitating travel planning. For example, travel-planning Internet websites are commercially available and well-known. Such websites typically permit a user to input a query with a requested location so that a map associated with the requested location may be provided to the user. Also, well-known websites allow the user to enter a start point and an end point for travel, which are then used to calculate and provide travel directions to the user.

By way of background for the detailed discussion of certain aspects of the present invention that will follow, FIGS. 1-4 depict certain aspects of an exemplary conventional digital mapping system. FIG. 1 illustrates a web browser user interface 100 that displays a map request entry web page 105. As shown, a user has entered a desired location of 353 Main St., Billings, Mont. 45619. After entering the desired location to be mapped, as shown in FIG. 1, the user then requests a map (typically from a remote server) by selecting a "Request Map" button 110. A map image is then typically generated at the remote server, transmitted to the user's computing device, and eventually displayed on the web browser user interface 100 in a map display web page.

FIG. 2 illustrates an exemplary map display web page 200 on a web browser user interface 100. Here, a map display webpage 200 displays the results of the map request from FIG. 1. The displayed information generally consists of a map image 205, which depicts the requested location and surrounding area. As shown in FIG. 2, the requested location is identified on the map image 205 by an address icon 208, and the address icon 208 is typically located in the center of map image 205. The requested location and address icon 208 may also be displayed on a map legend window 210 within map display web page 200. The address icon 208 is typically a simple two-dimensional image which, if displayed within map image 205 in close proximity with other such icons, may create visual clutter and confuse or mislead the user as to where each icon is actually pointing within map image 205.

The map webpage 200 may also display buttons or other user interface objects that may be selected to control the manner in which map image 205 is displayed. For example, as shown in FIG. 2, zoom control objects 220 are generally provided to allow the user to "zoom in" or "zoom out" and thereby affect the displayed scale of map image 205 accordingly, typically while retaining the desired location marked by address icon 208 at the center of the image. Also, direction buttons or other similar user interface objects, such as "down arrow" direction button 215, may be provided to allow the user to "pan" the image, such as by displaying more of the map information that was previously hidden because it was beyond the "southern" boundary of map image 205, while shifting and hiding a corresponding portion of the previously displayed "northern" portion of the map information. As shown in FIG. 2, such image control objects are conventionally displayed outside the boundary area of the map image 205, reducing the amount of space available for the map image 205 within the map display web page 200.

Typically, when image control objects (such as zoom control objects 200 or direction button 215 shown in FIG. 2) are selected, an HTTP request is transmitted to a server, which then transmits a new image containing the new map information to be displayed at the selected zoom level.

Specifically, in an exemplary system, as shown in FIG. 3, a web browser 300 sends an HTTP request containing location information for a requested map image to a web server 305. The HTTP request may consist of location data received via a web browser user interface 100 through a data entry web page 105, as illustrated in FIG. 1. For example, as shown if FIG. 1 and described earlier, a user may enter the following desired location to be mapped: 353 Main St., Billings, Mont., 45619. The user then requests the directions by selecting a "Request Map" button 110, and this selection event eventually causes the HTTP Request shown in FIG. 3 to be transmitted (directly or indirectly) from web browser 300 to web server 305. In response to the HTTP request, the web server 305 sends a database query ("DB Query") to a map vectors database 310. The map vectors database 310 typically determines the corresponding vectors for the desired location data and transmits these vectors to the web server 305. The web server 305 then typically generates a bitmap image of the desired map using the received vectors, and converts the bitmap into an image format that is supported by the web browser 300 (e.g., GIF, PNG, JPEG, and the like.). The web server 305 then transmits the image to the web browser 300, generally embedding it within Hypertext Markup Language (HTML) code. The map image is then displayed to the user via the web browser user interface 100 (as shown in FIG. 2 and described earlier). Thus, when the user requests a new map view, e.g., by entering a postal address, or by clicking a navigation link next to a current map view, the web browser 300 sends to a web server 305 a request indicating the boundaries of the new map view. The web server 305 in turn extracts the corresponding vector-based map data from a database, and draws a bitmap image of the map. The web server 305 then converts the bitmap image to an image format supported by the web browser 300 and returns the image, sometimes embedded in HTML, to the web browser 300 for display to the user. Commercial implementations of such systems include AOL's MapQuest (http://www.mapquest.com), Yahoo's Telcontar-based "SmartView" maps (http://maps.yahoo.com), and Microsoft's MapPoint.net suite (e.g., http://maps.msn.com).

FIG. 4 illustrates a second exemplary system used for providing map data to a web browser. As shown in FIG. 4, a web browser 300 transmits an HTTP request to a web server 305 in the same manner that was described earlier with respect to FIG. 3. Upon receiving HTTP request from web browser 300, the web server 305 shown in FIG. 4 transmits a database query ("DB Query") containing the requested location data to a map raster database 410. The map raster database 410 extracts the appropriate image based on the database query from among a larger pre-rendered map image. The requested image is then transmitted to the web server 305, which then transmits the image to the web browser 300 as described earlier. Thus, in a digital mapping system as shown in FIG. 4, the steps of extracting vectors and drawing a map image are replaced by simply extracting the appropriate part of a larger, pre-rendered image. Commercial implementations of such systems include Britain's MultiMaps (http://multimaps.com) and Australia's WhereIs (http://www-.whereis.com.au). It should also be noted that such systems typically generate the map images from the same vector-based files that would also be used to generate printed versions of such maps.

Certain providers of digital mapping web sites have observed that some of the above problems may be overcome by transmitting a number of smaller images (known as "tiles") from the web server 305 to the web browser 300. These smaller tiles can then be assembled by the web browser 300 into a larger image. For example Microsoft's TerraServer USA site (at http://terraserver.homeadvisor.msn.com/) currently uses a tiling approach for displaying satellite images.

BRIEF SUMMARY

Various methods, systems, and apparatus for implementing aspects of a digital mapping system are disclosed. One such method includes sending a location request from a client-side computing device to a map tile server, receiving a set of map tiles in response to the location request, assembling said received map tiles into a tile grid, aligning the tile grid relative to a clipping shape, and displaying the result as a map image. One apparatus according to aspects of the present invention includes means for sending a location request from a client-side computing device to a map tile server, means for receiving a set of map tiles in response to the location request, means for assembling said received map tiles into a tile grid, means for aligning the tile grid relative to a clipping shape, and means for displaying the result as a map image. Such an apparatus may further include direction control or zoom control objects as interactive overlays on the displayed map image, and may also include route or location overlays on the map tile image.

BRIEF DESCRIPTION OF THE DRAWINGS

The accompanying drawings, which are incorporated in and constitute a part of this specification, illustrate various embodiments. In the drawings.

DETAILED DESCRIPTION

Figure 1:
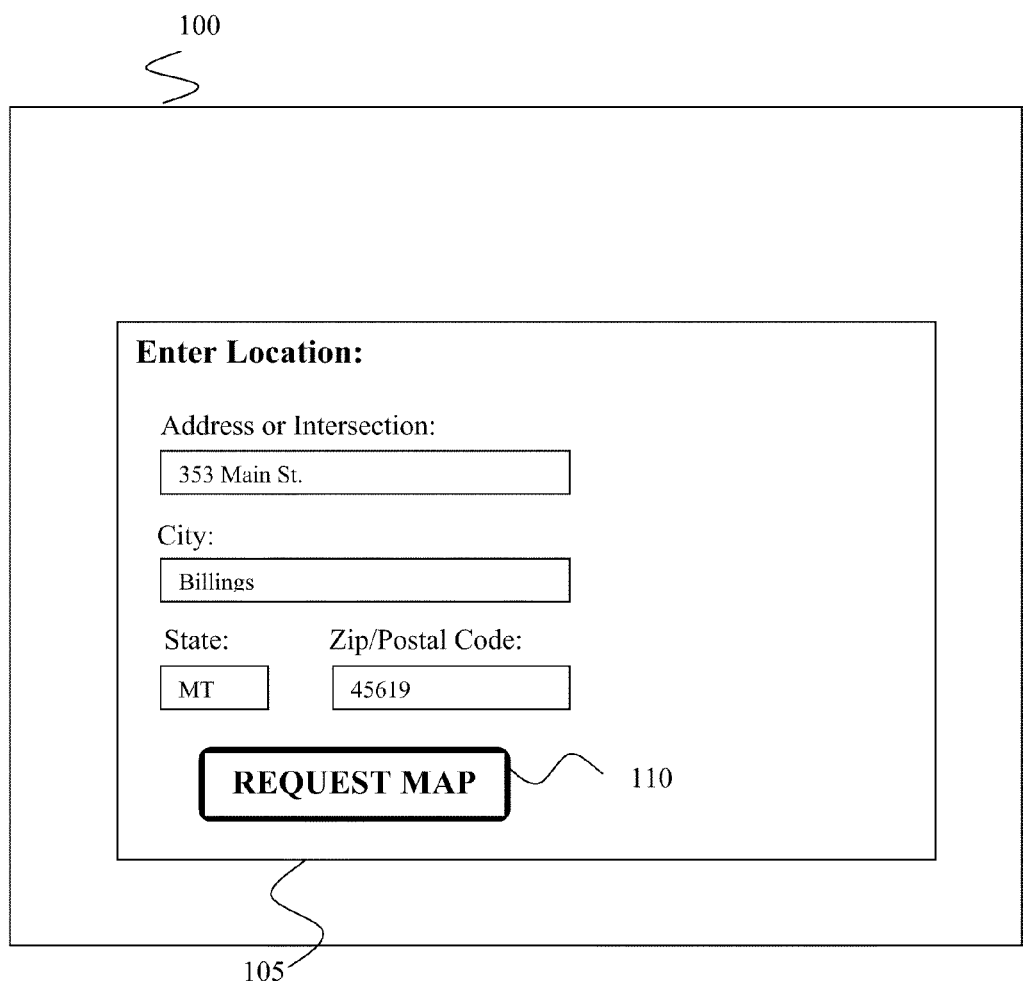
FIG. 1 illustrates an exemplary web browser displaying a map request entry web page.

Various aspects of the disclosure are described herein in the context of an apparatus, system, and method for obtaining and displaying mapping information. Those of ordinary skill in the art will realize that the following description is illustrative only and not in any way limiting. Other aspects will readily suggest themselves to such persons having the benefit of this disclosure.

For example, any number of computer programming languages, such as the Java language, JavaScript, Java Applet technology, C, C++, Perl, Pascal, Smalltalk, FORTRAN, assembly language, HTML (i.e., Hypertext Markup Language), DHTML (i.e., Dynamic Hypertext Markup Language), XML (i.e., eXtensible Markup Language), XLS (i.e., eXtensible Style Language), SVG (i.e., Scalable Vector Graphics), VML (i.e., Vector Markup Language), Macromedia's Flash technology, and the like, may be used to implement aspects of the present invention. Further, various programming approaches such as procedural, object-oriented or artificial intelligence techniques may be employed, depending on the requirements of each particular implementation.

The same reference numbers will be used throughout the drawings and description in this document to refer to the same or like parts. Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

Figure 5:
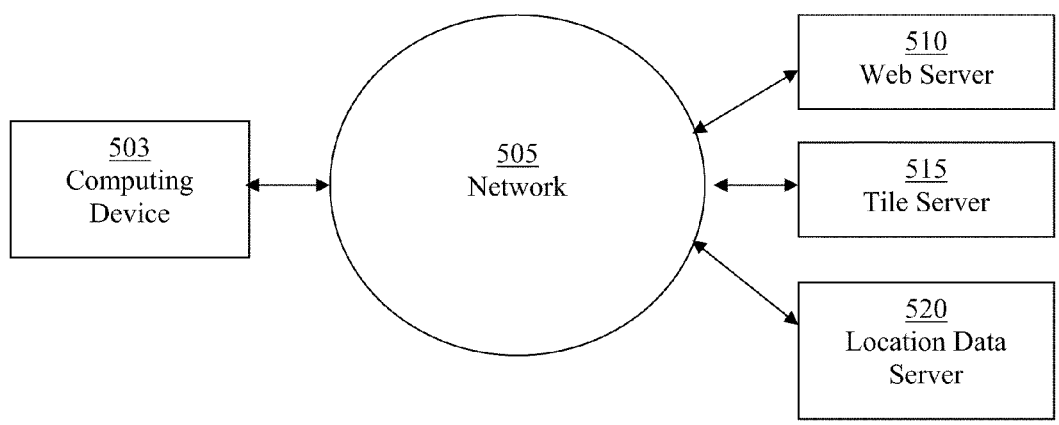
FIG. 5 illustrates a distributed network system according to aspects of the present invention.

FIG. 5 illustrates a distributed network system 500 according to aspects of the present invention. A computing device 503 is shown, connected to a network 505. Various servers are also connected to the network 505. For instance, a web server 510, a tile server 515, and a location data server 520 are all shown as being in communication with the network 505, although other servers (not shown) may also be connected to the network 505. The computing device 503 may be any type of device configured for computing, such as a personal computer, a mobile phone, a personal digital assistant, a navigation system located in a vehicle, and so on. The servers 510, 515 and 520 may each be any device capable of hosting services over the network 505, such as a network server or a web server. The servers 510, 515, and 520 may also be capable of determining and/or obtaining some or all mapping information based on user input. Alternatively, the computing device 503 may be equipped with the capability to determine and/or obtain travel directions. In some implementations, the computing device and the servers (or various portions thereof) may be co-located in one or more machines The network 505 may be any type of distributed network, such as a local area network, wide area network, switched telephone network, Intranet, Internet or World Wide Web network. Alternatively, the network 505 may be a direct connection between the computing device 503 and the servers 510, 515, and 520. The computing device 503, network 505 and/or servers 510, 515, and 520 may be in communication via any type of wired or wireless connection. Moreover, the computing device 503, the servers 510, 515, and 520, and other computing devices (not shown), and/or other servers (not shown) in communication with the network 505 may be used to perform any or all functions described herein.

Figure 6:
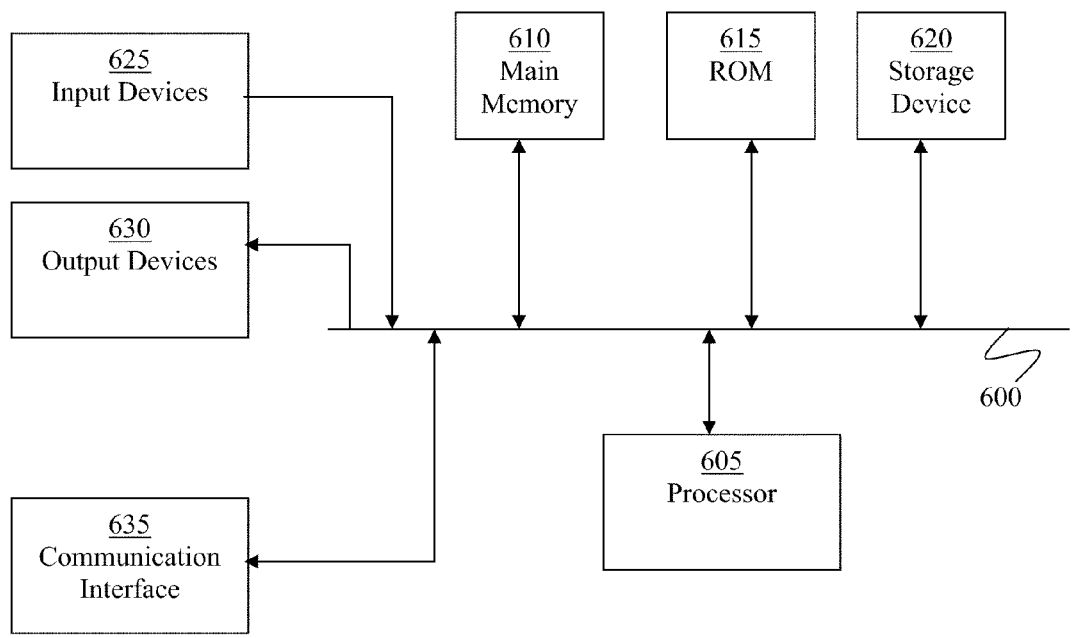
FIG. 6 is an exemplary block diagram of a client-side or server-side computing device according to aspects of the present invention.

FIG. 6 is an exemplary diagram of a computing device 503, or of servers 510, 515, and 520. Computing device/servers 503/510/515/520 may include a bus 600, one or more processors 605, a main memory 610, a read-only memory (ROM) 615, a storage device 620, one or more input devices 625, one or more output devices 630, and a communication interface 635. Bus 600 may include one or more conductors that permit communication among the components of computing device/server 503/510/515/520.

Processor 605 may include any type of conventional processor, microprocessor, or processing logic that interprets and executes instructions. Main memory 610 may include a random-access memory (RAM) or another type of dynamic storage device that stores information and instructions for execution by processor 605. ROM 615 may include a conventional ROM device or another type of static storage device that stores static information and instructions for use by processor 605. Storage device 620 may include a magnetic and/or optical recording medium and its corresponding drive.

Input device(s) 625 may include one or more conventional mechanisms that permit a user to input information to computing device/server 503/510/515/520, such as a keyboard, a mouse, a pen, a stylus, handwriting recognition, voice recognition, biometric mechanisms, and the like. Output device(s) 630 may include one or more conventional mechanisms that output information to the user, including a display, a printer, a speaker, and the like. Communication interface 635 may include any transceiver-like mechanism that enables computing device/server 503/510/515/520 to communicate with other devices and/or systems. For example, communication interface 635 may include mechanisms for communicating with another device or system via a network, such as network 505.

As will be described in detail below, computing device 503 and/or servers 510, 515, and 520, may perform operations based on software instructions that may be read into memory 610 from another computer-readable medium, such as data storage device 620, or from another device via communication interface 635. The software instructions contained in memory 610 cause processor 605 to perform processes that will be described later. Alternatively, hardwired circuitry may be used in place of or in combination with software instructions to implement processes consistent with the present invention. Thus, various implementations are not limited to any specific combination of hardware circuitry and software.

Figure 2:
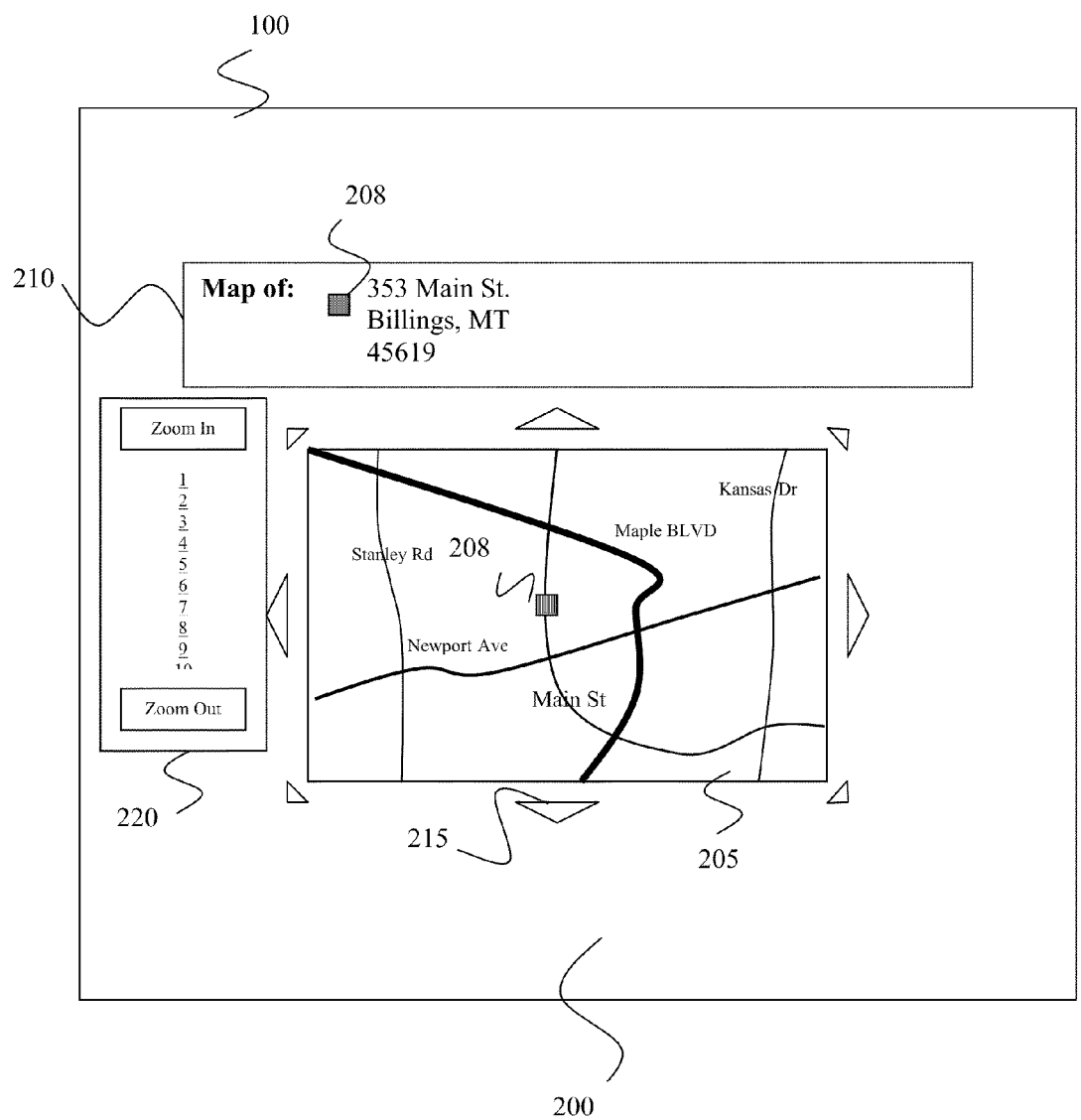
FIG. 2 illustrates an exemplary map display on a web browser.
Figure 3:
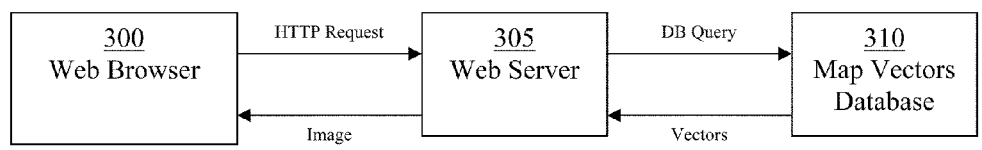
FIG. 3 illustrates an exemplary conventional vector-based digital mapping system architecture.
Figure 4:
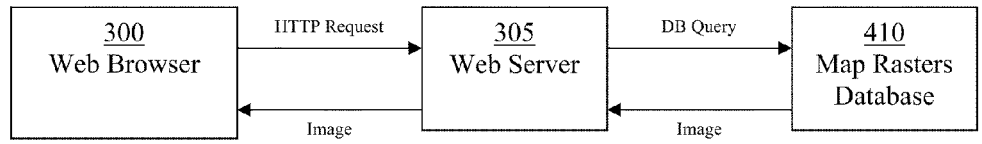
FIG. 4 illustrates an exemplary conventional raster-based digital mapping system architecture.

A web browser (such as web browser 300 shown in FIGS. 3 and 4) comprising a web browser user interface (such as web browser interface 100 shown in FIGS. 1 and 2) may be used to display information (such as textual and graphical information) on the computing device 503. The web browser 300 may comprise any type of visual display capable of displaying information received via the network 505 shown in FIG. 5, such as Microsoft's Internet Explorer browser, Netscape's Navigator browser, Mozilla's Firefox browser, PalmSource's Web Browser, or any other browsing or other application software capable of communicating with network 405. The computing device 503 may also include a browser assistant. The browser assistant may include a plug-in, an applet, a dynamic link library (DLL), or a similar executable object or process. Further, the browser assistant may be a toolbar, software button, or menu that provides an extension to the web browser 300. Alternatively, the browser assistant may be a part of the web browser 300, in which case the browser 300 would implement the functionality of the browser assistant.

The browser 300 and/or the browser assistant may act as an intermediary between the user and the computing device 503 and/or the network 505. For example, source documents or other information received from devices connected to the network 505 may be output to the user via the browser 300. Also, both the browser 300 and the browser assistant are capable of performing operations on the received source documents prior to outputting the source documents to the user. Further, the browser 300 and/or the browser assistant may receive user input and transmit the inputted data to servers 505/515/520 or other devices connected to the network 505.

Exemplary System Overview and User Interface

As described in more detail below, certain aspects of one embodiment assume the existence of large (e.g., on the scale of the entire United States), contiguous map raster images at each of an appropriate set of discrete zoom-levels. During a one-time, off-line phase, the system generates and cuts these large raster images into segments (e.g., rectangular tiles) of a size generally an order of magnitude smaller than the desired map view, and stores these tiles in a format supported by web browsers in a server-side database.

Figure 7:
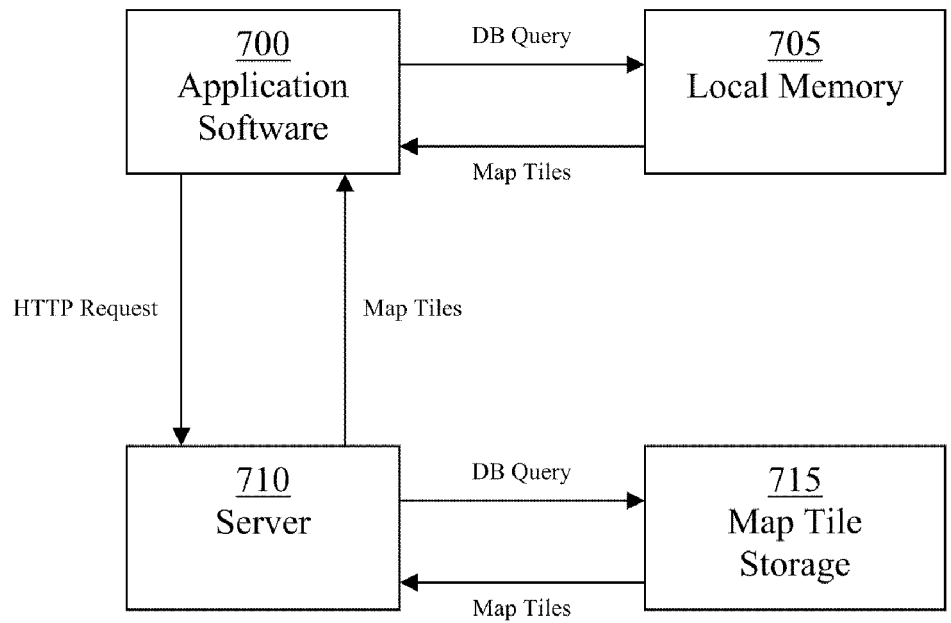
FIG. 7 illustrates an exemplary tile-based digital mapping system architecture according to aspects of the present invention.

As shown in the example of FIG. 7, when a web user requests a new map view via application software 700 (such as web browser 300 shown in FIGS. 3 and 4), HTTP requests are sent to a server 710 only for the smallest set of tiles needed in conjunction with the tiles that are already present in the web browser (or in the web browser's cache, shown as Local Memory 705 in FIG. 7 (which, without limitation, could be implemented as Main Memory 610, ROM 615, and/or Storage Device 620 as shown in FIG. 6) to produce the new view. The format of the responses to these HTTP tile requests contains information in the header fields that encourages the web browser to cache the tiles locally. By executing a set of scripts, the web browser then seamlessly assembles the combined set of tiles into the new map view for presentation to the user. Since the old map view in general is still present in the browser, additional scripts may be used to smoothly animate the transition from the old to the new map view, either as part of a panning and/or zooming operation. Moreover, location markers and routes can be overlaid on top of the pre-rendered map tiles, for example in response to user requests for driving directions, local search, yellow page look-ups, and the like. In addition, similar techniques can be used to highlight areas and streets on the map image, for example.

Figure 8:
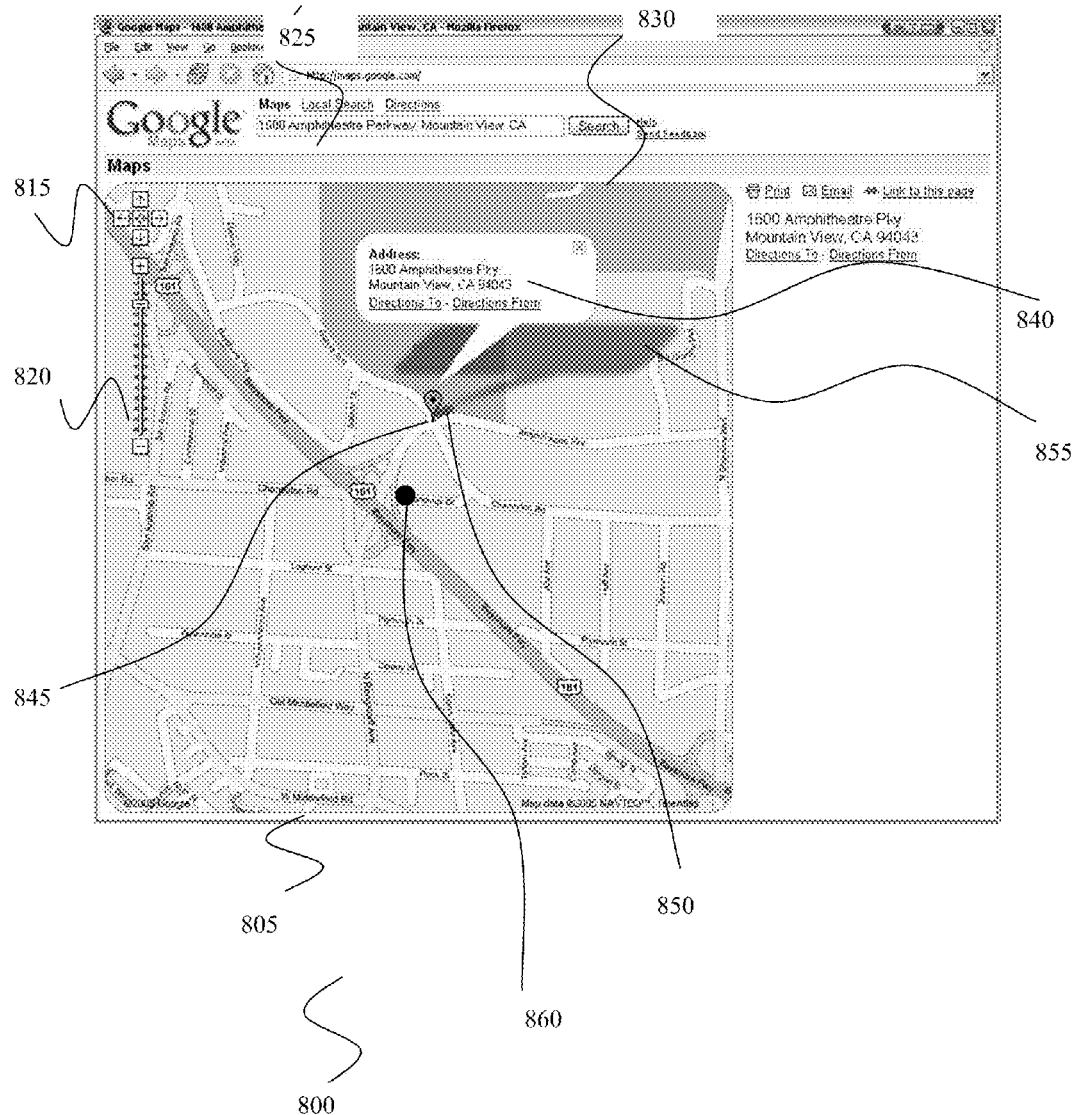
FIG. 8 illustrates an exemplary combined map request entry and map display web page according to aspects of the present invention.

From the perspective of an end-user (such as a user interacting with a web browser running on computing device 503 shown in FIG. 5), FIG. 8 depicts one embodiment of a combined map request and map display page 800 according to aspects of the present invention. As shown in FIG. 8, page 800 includes a map image 805, overlaid directional map control objects 815, overlaid zoom control objects 820, location request text entry field 825, search button 830, information window 840, location marker 845, location marker shadow 850, and information window shadow 855. As will be described in detail later, map image 805 is actually generated by aligning a tile grid relative to a clipping shape having approximately the same size and shape as the map image 805. The tile grid in one embodiment comprises a number of smaller individual map tiles that are seamlessly arranged into a larger image for display. Using image overlay technologies and absolute positioning techniques that are well-known to those skilled in the art, directional map control objects 815 and zoom control objects 820 may actually be located within map image 805 itself, thereby increasing the area within display page 800 that is available for the map image 805. In this way, an arbitrary size for map image 805 may be implemented, which is not limited to a whole number of map tiles. Moreover, any arbitrary point may be located at the center of map image 805. In one embodiment, location query text entry field 825 is implemented as a single text field, such that the various components of the desired location to be mapped (such as its street address, city, state, or zip code) do not need to be specified using multiple fields. As will be discussed later, in one embodiment, FIG. 8 also includes billing point 860 at the center of the map image (although billing point 860 is typically not a visible feature on map image 805).

When search button 830 is selected, the desired location to be mapped that has been entered into text entry field 825 is parsed, either at the user's computing device or at a remote server, and map image 805 is generated and displayed (by means of the detailed processes that are described throughout this document). The desired location that was entered into entry field 825 may also be repeated and displayed as the map title 840, either in its original or in its parsed form. The desired location to be mapped is graphically identified within map image 805 by location marker 845 and its shadow 850. As will be described later, by using effects that make location markers to appear visually as two-dimensional, and which comprise angled shadows, visual clutter within map image 805 is minimized, especially when multiple location markers are located in close proximity to each other, and the actual location on the map corresponding to the location marker may be more easily identified as a point.

In terms of user image control functionality, directional map control objects 815 may be implemented as a set of arrow-labeled pan buttons that cause the map to pan, say, by 25% of the clipping shape size in the direction of the arrow. These buttons could also be labeled by compass orientation, such as "west," "north," or "north-west." As shown in FIG. 8, zoom control objects 820 may include buttons labeled "+" and "−" that cause the map to zoom in and out by a single level, respectively. These buttons may also be labeled by the main geographic abstraction of the corresponding zoom level, e.g., "street," "city," "county," "state," "country," and the like. As also shown in FIG. 8, zoom control objects 820 may also include a slider with a discrete position for each zoom level. From the user's perspective, moving the slider to a specific zoom level may have the same effect as selecting the corresponding zoom level.

As additional examples of user interface functionality provided in one embodiment, "clicking on" or otherwise selecting a specific portion of map image 805 causes the selected location to pan to the center of the map image 805, while "double-clicking" or otherwise emphatically selecting a specific portion of map image 805 causes the selected location to pan to the center of the map image 805 and the zoom level to simultaneously increase. In another embodiment, "double-clicking" or otherwise emphatically selecting a specific portion of map image 805 causes the selected location to pan to the center of the map image 805, while clicking on or otherwise selecting a location marker (either a marker within map image 805 or a marker adjacent to map image 805) causes an information window associated with the marker to open, and subsequently clicking on or otherwise selecting any portion of the map image causes the information window to close. Dynamic resizing of maps is also supported in one embodiment. For example, when a display window 800 is resized, the map image 805 inside the window is re-centered (so as to preserve the location that was the center in the previous window size), and the map is resized (so that it shows a smaller area if the new window is smaller, or a larger area if the new window is larger), without changing the zoom level or generally requiring the re-transmission of image information to the user's web browser. In one embodiment, the user can "grab" a corner or other portion of the map image 805 (e.g., by holding down a mouse button while a mouse icon is pointing to the selected corner) and "drag" it to resize the map image (e.g., by holding the mouse button down while moving the mouse to a selected location and then releasing the mouse button).

One embodiment implements mouse dragging functionality, whereby a map view may be smoothly shifted, for example, by holding down the user's mouse button, dragging the mouse to a new location until the desired map view is effected, and then releasing the mouse button. Moreover, map scrolling functionality is also implemented in one embodiment, whereby a map view may be shifted (or "panned") simply through activation of the arrow keys on a user's keyboard, or via a similar user action.

In one embodiment, entering a whole or partial postal address into text entry field 825 causes the map image 805 to pan to the corresponding location and zoom to a level that depends on the completeness of the address that was entered. For example, entering "6936 Bristol Dr., Berkeley Calif." pans to the corresponding location and sets the zoom level to be close to street level, whereas simply entering "Berkeley, Calif." without more specific address information would pan to the center of the city of Berkeley and set the zoom level to city level. Moreover, location outlines are implemented in one embodiment, such that if a user specifies a general area (e.g., a city, state, or zip code) instead of a specific address, an outline can be drawn around the general area to highlight it (as illustrated, for example, by location outline 2810 in FIG. 28). This functionality can assist a user to gauge distances and focus on areas of interest. Also, in one embodiment, the user may define a set of shortcuts (such as "home," "work," or "grandmother's house"), which when entered or otherwise selected cause a "jump" action in the map image to the desired shortcut location (or a "zoom/pan" action if the requested location is sufficiently close to the current location).

As shown in FIG. 8, one embodiment also implements "information window" functionality, whereby clicking on or otherwise selecting a location marker such as marker 845 opens an interactive window 840 and its shadow 855 overlaid within map image 805 that contains more information about the location represented by the marker.

In addition to entering a single location to be mapped into text entry field 825, users may execute combined searches in one embodiment, whereby users may specify items to search for and locations to map all within a single text box (e.g., "movies in San Francisco" or "pizza near Mountain View"). Moreover, in conjunction with the location shortcuts described earlier, users can give names to specific locations (e.g., "home", "work") (which may or may not be associated with an address book or similar database or utility on the user's computing device), and then employ the shortcut names when entering searches into text entry field 825 (e.g., when searching for "bars near work").

Figure 27:
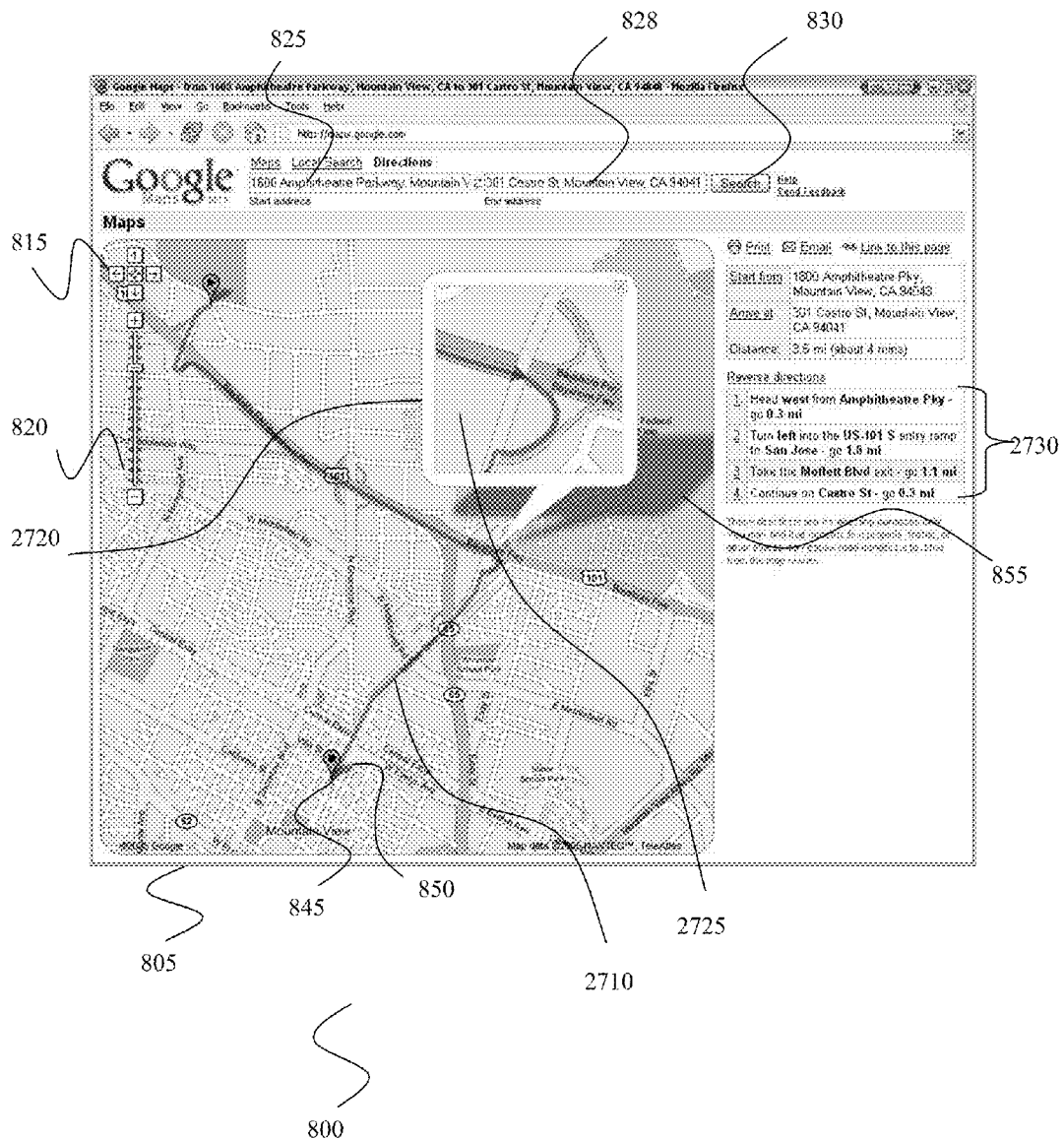
FIG. 27 depicts an exemplary map display web page with an overlaid driving direction route trace according to aspects of the present invention.

One embodiment also implements driving direction functionality, either by means of a single text entry field 825 as shown in FIG. 8, or alternatively, by means of one text entry field for the starting location and a second text entry field for the end location (as illustrated by text entry fields 825 and 828 shown in FIG. 27). As a further exemplary alternative, driving direction functionality may also be implemented by two sets of specific text entry fields, one set for the starting location fields (e.g., starting street address, starting city, starting state, etc.), and a second set for the end location fields. Regardless of the driving direction entry field interface, one embodiment implements client-side rendering of the route information. Specifically, in one embodiment, the server transmits the turn-by-turn textual directions to the client computing device, along with the vector information for the graphical depiction of the entire route.

The graphical driving directions are then rendered by the client as an overlay on top of the previously rendered map image. In another embodiment, once the client receives the vector information, the client computes the graphical definition of the route overlay image and then transmits a request to the server to supply the actual overlay image. Moreover, as shown in FIG. 27, textual driving direction maneuvers 2730 (e.g., "Take the Moffett Blvd. exit") may be displayed on the web page 800 near the map image 805. Clicking on or otherwise selecting one of the textual driving directions opens an information window pointing to the corresponding section of the map image 805 (e.g., the freeway off-ramp from southbound US-101 to Moffett Blvd.). As shown in FIG. 27, the information window displays a blow-up of the corresponding section of the map image 805.

In one embodiment, the information window additionally contains a "satellite" button or similar user interface object that, when clicked or otherwise selected, replaces the graphical blow-up of the map with a corresponding satellite photograph of the same area. The graphical driving directions (i.e., the traces depicting the route) can also be displayed as an overlay on top of the satellite picture. A "satellite" button or similar user interface object may also be included within (or associated with) the main map image 805 such that, when clicked or otherwise selected, the "satellite" button replaces the pictorial type of map image 805 depicted in FIG. 8 with a corresponding satellite photograph of the same area.

Server-Side Architecture and Map Tile Generation

In one embodiment, maps are displayed by stitching together in the browser a set of pre-rendered "tiles" of map image. These map tiles are produced during an off-line phase by drawing very large maps of the entire geographic area covered in each of a predetermined number discrete zoom-levels (e.g., 15), then cutting those maps into tiles, and encoding the tiles into an appropriate image format (e.g., GIF). The pre-rendered tiles are served as static images from a set of servers. For example, to cover the entire continental United States, hundreds of millions of tiles are required, with a total file size for the tiles in the order of hundreds of Gigabytes of data. Instead of drawing a map image from the underlying data on demand, the entire map is pre-drawn in sections (tiles), and the appropriate tiles are sent to the client when they are needed. Thus, in general, a given map tile need only be transmitted to the client once. This approach is more reliable, faster, and requires lower bandwidth than conventional systems.

Thus, in an off-line process that is transparent to the user, a set of large, contiguous, pre-rendered raster images of the entire area covered by the map system are generated. One such set of raster images is provided for each zoom-level, ranging from street to country level, for example. Each map image 805 (as shown in FIG. 8) that is eventually assembled and displayed at a user's web browser matches a sub-area (typically shaped as a rectangle) of one of these large pre-determined raster images. Alternatively, the map image boundary may be changed to appear as a different shape (e.g., a rectangle with rounded corners as shown in FIG. 8) by overlying images onto the map image boundary that match or blend with the background surrounding the map image.

In one embodiment, the zoom levels are numbered 0 thru Z, where 0 represents the level closest to street level, and Z the level the furthest away from street level. An arbitrary latitude/longitude ("lat/lon") point within the area of interest is designated and defined as the origin, or origo (for example the geographic center of the contiguous United States). Then, at each zoom level z, the coordinate triplet (0, 0, z) is assigned to the pixel of the z-level raster image containing this origin. Using the standard computer graphics convention that x-axis coordinates grow left-to-right, and y-axis coordinates grow up-to-down, a unique coordinate triplet (x, y, z) is assigned to each pixel of each of the raster images.

A coordinate conversion routine, given a zoom-level z, converts a lat/lon coordinate pair to the appropriate (x, y, z) pixel coordinate, and vice versa. The details of this conversion depend on the map projection that was used in producing the raster images in the first instance.

Figure 9:
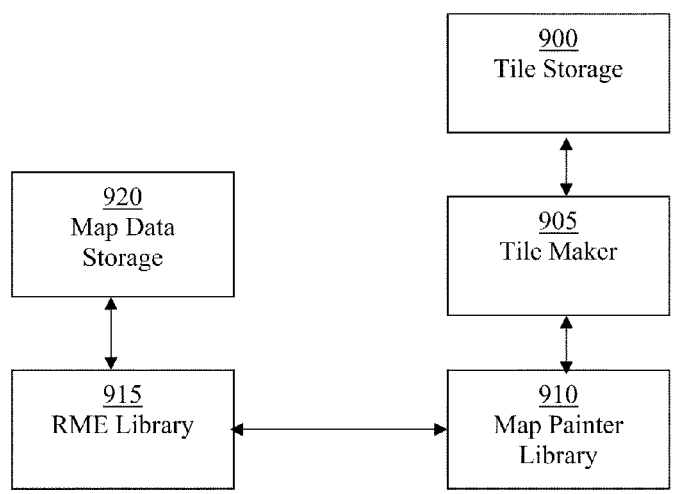
FIG. 9 illustrates an exemplary server-side architecture according to aspects of the present invention.

During an initial, off-line phase that need only be performed when the underlying map information changes significantly (e.g., once every few months), each of the large raster images are "cut" into rectangular tiles. As shown in FIG. 9, in one embodiment, the process of generating and cutting the large raster images into map tiles is cooperatively performed by tile maker 905 in conjunction with map painter library 910, and a commercially available RME ("rich map engine") library 915. Among other tasks, the tile maker 905 ensures that adjacent sub-image tiles line up closely along their common border, in particular where label-placement is concerned. Given map projection issues well known to persons skilled in the art, it may be necessary to divide the area covered by the map system into smaller areas, and deal with each separately.

Still referring to FIG. 9, the underlying map data is stored in map data storage area 920. In one embodiment, the stored map data comprises commercially available NavTech data that has been compiled by Telcontar (a commercial provider of digital map and navigation information) into RMF (Rich Map Format) files. Persons skilled in the art will recognize that RMF is a format compact, binary format optimized for spatial query processing. Among other tasks, one embodiment of the present invention takes advantage of this format to generate map images and create route information. RMF is a spatial format that organizes data in a multi-dimension fashion, such that features near each other in reality are stored close together in the database. This means that once an item in a spatially formatted dataset is found, other items close by can also be found with relative ease. Persons skilled in the art will recognize that there are many other ways to organize the data, such as sequentially or in layers. Still referring to FIG. 9, in one embodiment the tile maker 905 communicates with the map painter library 910 to request map data for making tiles.

The map painter library 910 in turn communicates with the commercially available RME library 915 to access information from map data storage 920. Persons skilled in the art will recognize that the RME library supports spatial queries that request information involving the geographic relation of two or more items. Examples are "What map features fall within a given area?" or "What map features fall within a given area that have a priority level higher than a certain threshold?." The result of the spatial query is transmitted to the tile maker 905 via the map painter library 905 and is used to generate map tiles. The resulting map tiles of the tile making process are stored in map tile storage area 900.

To re-produce any sub-area view of the large raster image as a map image 805 on a user's web browser, in one embodiment browser-side scripts require only the smallest set of tiles that together completely covers the desired view. For any given implementation, the size of the tiles can be determined heuristically, given the following trade-off: (1) Larger tiles tend to increase the total size (in both pixels and bytes) of the tiles needed to produce a given view; while (2) Smaller tiles tend to increase the number of separate HTTP requests needed to produce a given view. In one embodiment, a tile size of 128×128 pixels is used, stored in the GIF format. Other embodiments use a tile size of 256×256 pixels, stored either in the GIF, JPEG, or PNG formats. Other tile sizes and image storage formats may be used, depending on the requirements of each particular implementation. These tiles thus form a regular, square grid, and this property facilitates system implementation in one embodiment. However, persons skilled in the art will recognize that any other division of the large raster images into tiles of any shapes and sizes that allows for seamless assembly on the client-side may also be used to achieve the effect of the present invention.

Alternatively, rather than a database on the server side, in one embodiment each tile may simply be stored in a separate file, accessible using unique URLs such as http://<domain>/7/−18/1/−145__12__7.gif, where the directory path 7/−18/1 in this example depends solely on the tile coordinates, in this exemplary case equal to (−145, 12, 7).

For simplicity, the first tile of each zoom-level z is located such that the tile's upper-left pixel has coordinates (0, 0, z). This rule facilitates assignment of a unique coordinate triplet to each tile by integer-dividing the pixel x and y coordinates of the tile's upper-left pixel by the width and height of the tile, respectively. Thus, a total of three coordinate systems are utilized: lat/lon coordinates, pixel (x, y, z) coordinates and tile (x, y, z) coordinates. As persons skilled in the art will recognize, this particular choice of coordinate systems is arbitrary, and chosen simply to aid in describing the algorithms used in one embodiment. In general, any consistent coordinate system will suffice. In turn, each pixel belongs to a unique tile, the coordinates of which are easily computed.

Front-End Server

In one embodiment, a front-end server (such as server 710 depicted in FIG. 7 or web server 510 in FIG. 5) responds to each query submitted by a user by returning a web page to a hidden frame that contains data accessed by client-side code implemented in JavaScript. Thus, the front-end server 710/510 interacts with a JavaScript-based set of programs running on the user's browser to generate dynamic HTML ("DHTML") code. Via this mechanism, user interface functionality described earlier, such as panning and zooming the map view 805 shown in FIG. 8, can be implemented within the client computing device 503 without interaction with the front-end server 710/510. Instead, as shown in FIG. 5, the client computing device 503 merely has to request and display tiles as needed from the tile server 520, which serves tile sets that have been previously generated as described above with reference to FIG. 9.

The basic mode of operation of front-end server 710/510 is to provide a response to a user's query entered into the text entry field (such as field 825 shown in FIG. 8) in the map display page 800. When a user submits a query, the client-side JavaScript code forms a HTTP request that contains the contents of the query as well as the current state of the map view and submits that information to front-end server 710/510, directing the resultant page to appear in a hidden iframe (or "virtual page"). This mechanism allows the client to receive data required to implement the mapping system (including various features of the mapping system, such as, for example, overlays for driving directions and other items, without having to reload the main/visible web page, but while still enabling the browser's history and/backward/forward buttons to work as expected, so that the user may do a local search, for example, then get directions, and click back to get back to local search results. Once the virtual page is loaded at the client, JavaScript on the main page may pull the data from the virtual page and adjust the main page accordingly, by: (1) changing the HTML title; (2) changing the search form; (3) replacing the HTML IMG references in the tile grid with the URLs of the tiles to be displayed in the map image; (4) panning and/or zooming the map display; and/or (5) adding or replacing one or more overlays on the map.

Figure 28:
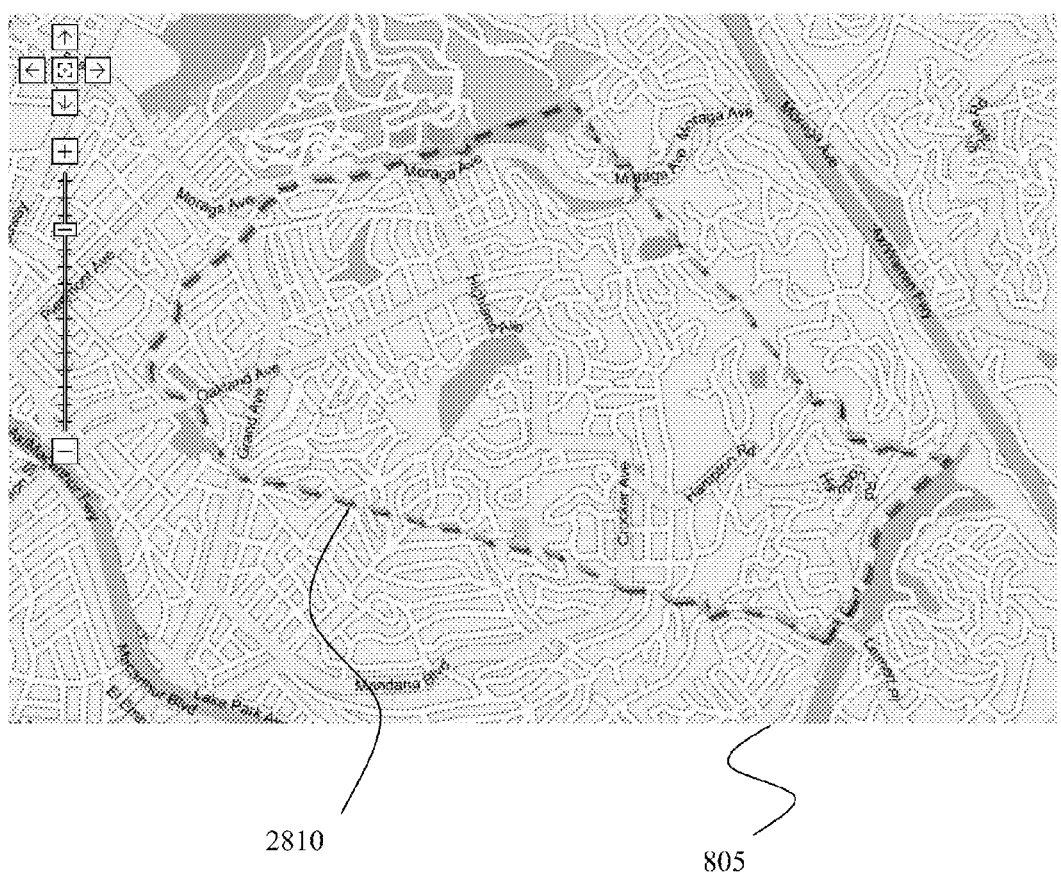
FIG. 28 depicts an exemplary map display web page with an overlaid area boundary trace according to aspects of the present invention.

In one embodiment the following types of queries are recognized and processed:

1) Location queries (e.g. "Berkeley"). These are queries that contain a single geographic location. In response to such queries, the front-end server 710/510 directs the client to pan and/or zoom the map to that location and to mark the boundaries of that location on the display. For example, in one embodiment a "point" query (e.g., for a specific address, as shown in FIG. 8) results in a display that includes a location marker for the requested location, while a "line" query (e.g., for a specific street in a specific city, without specifying the street number) results in a display where the requested line is highlighted on the map as an overlay, and an "area" query (e.g., for a specific city such as "Anytown") results in a display where the requested area is highlighted on the map image as an overlay (as shown in FIG. 28).

2) Local search queries (e.g. "pizza", "post office"). These are queries that contain a business name, category, or other set of search terms, but no geographic locations. In response to such queries, using techniques that are known to those skilled in the art, the front-end server 710/510 searches for businesses matching the query within (or near) the current map view based on the user's navigation of the map or the positioning resulting from querying for a location, and directs the client computing device 503 to display the results as a set of location markers 845/850 on the map image 805, optionally along with a legend associated with the map image 805 describing the search result that each marker symbolizes.

3) Qualified local search queries (e.g. "pizza in Palo Alto", "single malt scotch near San Francisco"). These are queries that contain both search terms and a geographic location. In response to such queries, the front-end server 710/510 directs the client computing device 503 to pan and/or zoom to the indicated location and to display the search results found within or around that location. Alternatively, the geographic information contained in the query is converted to lat/lon points, a local search is conducted with respect to this set of lat/lon points, and subsequently the zoom level is set to ensure that all of the locations in the result of the local search are displayed on the map image (see FIG. 24 for a resulting display, given a search for "great sushi in New York").

4) Driving directions queries (e.g., "from San Francisco to New York," "from home to work," or "from 123 Main St. Los Angeles, Calif. to 801 University Ave. Palo Alto, Calif."). These are queries that contain two distinct geographic locations. As described earlier, in response to such queries, in one embodiment front-end server 710/510 can transmit the route information, along with textual turn-by-turn directions, to the client, which may then display the route as a highlighted overlaid path in the map image 805. As also described earlier, the user may interact with these textual directions by zooming into portions of the route (e.g., by clicking on or otherwise selecting specific driving maneuvers) to obtain additional textual or graphical details.

The front end server 710/510 can be implemented as a number of different logical control flows which are selected based on a query classifier. A query classifier includes a location extractor that takes a set of templates defining how a query string may be broken down into constituent parts including search terms, geographic location identifiers, and literal text. For example, a template such as "{QUERY}{STANDALONE_CITY}" would match a query entered by a user simply as "pizza palo alto" and result in a search for "pizza" near the centroid of Palo Alto, Calif. The location extractor has access to a relatively large database consisting of a set of location names of various types, such as street names, city names, and the like.

Figure 10:
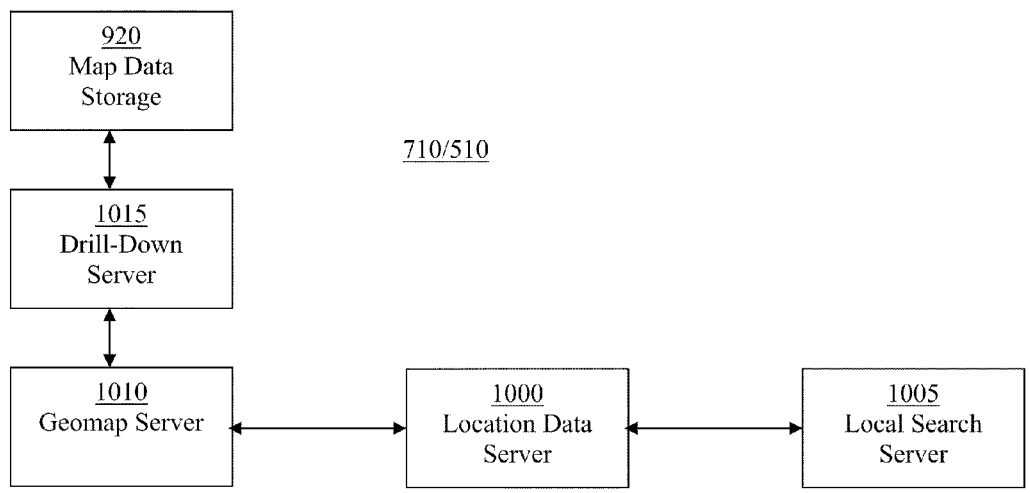
FIG. 10 illustrates further aspects of an exemplary server-side architecture consistent with principles of the present invention.

In one embodiment, as shown in FIG. 10, the front end server 710/510 also includes a geocoding/geomap server 1010 that converts an unstructured location into a structured location plus a geographic point/line/area that can be marked on the map image 805 of FIG. 8. As is also shown in FIG. 10, Geomap server 1010 cooperatively communicates with drill-down server 1015, map data storage area 920, location data server 1000, and local search server 1010 to process geographic features such as street addresses, streets, intersections, points of interest, cities, neighborhoods, ZIP codes, counties, metropolitan areas, states, and the like (as well as their international equivalents). For point features such as street addresses, the result of the conversion is a single (latitude, longitude) point. For linear features such as streets and for area features such as cities, the result of the conversion is either a polyline (e.g., for a street) or a polygon (e.g., for a city), that defines each of those features. Alternatively, the result of the conversion may simply be an axis-aligned bounding box.

As is also shown in FIG. 10, in one embodiment, the front end server 710/510 also includes a local search server 1005 for finding search results in or around a given geographic location. For combined queries such as "pizza in palo alto," the local search server 1005 may wait to receive the results of the geocoding/geomap server 1010 before executing. For digital mapping systems, implementing a local search scoring algorithm within local search server 1010 that has a flexible definition of location restriction and a notion of distance flattening is desirable. The user should advantageously be able to search for businesses within the current map view that match a given set of query terms. This requires that the local search code allow restrictions that have the form of minimum and maximum latitude and longitude coordinates, instead of just centerpoint and radius. Some degree of distance flattening is generally necessary. In other words, results at the exact center of the map display should not be scored higher than results elsewhere in the display view. For example, searching for "pizza in palo alto" should not score two Palo Alto pizza parlors differently because one happens to be closer to the centroid of Palo Alto than the other.

In one embodiment, when a "driving directions" query is recognized by front-end server 510/710, the front-end server converts the source and destination addresses to a set of simple turn-by-turn directions, as well as a polyline specifying the (latitude, longitude) coordinates along the route. The front-end server 510/710 may then transmit the turn-by-turn directions to the client computing device using XML (e.g., in a vPage), along with a set of polylines that contains the vector information along the entire route. In one embodiment, before transmitting the set of polylines to the client, the front-end server reduces the total number of graphical data points that are transmitted to the client (e.g., using geometrical operations well known to persons skilled in the art to eliminate from the set of polylines any data point that, when eliminated, results in an error with respect to the full set of polylines no higher than a certain predetermined threshold, such as one or two pixels), and assigns each non-eliminated data point to a "group" that defines the zoom level at which the point becomes visually relevant (e.g., data points in group "A" may be required to be displayed at every zoom level, while data points in group "B" are not required to be displayed until the zoom level has increased past the zoom level corresponding to a city-level view or finer, etc.).

In one embodiment, initially, after a user enters a driving directions query, the map image 805 displays an overview of the entire selected route. The user may then zoom in to parts of the route to get more detailed views.

In one embodiment, a billing mechanism is implemented for keeping track of the number of map views requested by a user, e.g., for keeping track of how much total map area a user has visited in relation to the map view. Referring to FIG. 8, as mentioned earlier, a billing point 860 is defined at the center of the map image (although billing point 860 is typically not a visible feature on map image 805). Thus, for example, if map image 805 comprises an area defined as 400 pixels wide and 400 pixels high, other billing points are defined in the horizontal and vertical directions at intervals of 400 pixels (thereby creating a billing point grid). Thus, in one embodiment, every map view includes at least one transaction. If a user initiates a panning operation, the billing point grid "moves" along with the map, triggering additional billing transactions whenever a new billing point enters into the map view. For example, if the user pans the map image by 200 pixels to the right, a new billing point will come into view and trigger a new transaction. In one embodiment, a new transaction would also be triggered as a result of a zooming operation to display a previously unviewed map area at a given zoom level. Transactions are reported by the client to the front-end server 710/510 in one embodiment, which collects the transaction information from all users and uses is for contractual purposes with commercial providers of map information.

Client-Side Architecture and Algorithms

Embodiments of the present invention may be implemented using a wide range of technologies available in modern web browsers. A common graphical feature of certain embodiments is the ability to assemble a set of map tiles behind a "clipping shape." In addition, the host technology at the user's computing device 503 should allow for a reasonably efficient, dynamic change to the display layout. Preferably, but not necessarily, the client's web browser should perform such dynamic changes using a double-buffered (or similar) display to avoid flickering. For example, DHTML uses a double-buffered display engine. In one embodiment using DHTML, the browser executes script functions in response to events such as user input, HTTP completions and timeouts. All changes made to the web page during script execution are, at least logically, recorded in an off-screen buffer, which is displayed when the script yields control back to the browser.

As described in more detail below, client-side algorithms according to one embodiment proceed in general by making a set of changes to the map tile layout, and then requesting the host system to display the new frame defined by those changes. In one embodiment, the map display functionality at the client side may implemented in HTML code as follows:

```
<div id="mapView" style="position: relative; overflow: hidden;">
    <div id="mapDiv" style="position: absolute;">
        <table id="mapTable"><tbody>
            <tr><td><img src="images/bg.gif"></td>
            ...
        </table>
    </div>
</div>
```

In this embodiment, JavaScript code on the site pans and zooms the map by placing appropriate map tiles in the <img> elements of mapTable, and by moving mapDiv relative to mapView. Thus, the client-side algorithm in this embodiment implements two primary graphical elements. The first element is a "clipping shape" (typically a rectangle) through which the user will see the map image 805, and which defines the shape of the user's map view. Solely for the purpose of explaining a client-side algorithm in one embodiment, an arbitrary pixel of the clipping shape is assigned as its origin (for example the upper-left pixel in the case of a rectangular clipping shape). The second element is a grid of tiles larger than and placed behind the clipping shape, such that only the part of the grid that intersects the clipping shape is visible to the user. For the remainder of this discussion of one embodiment, it shall be assumed that this grid is rectangular, and that it only changes size if and when the clipping shape does. Persons skilled in the art will recognize that variations of the algorithms discussed herein exist where this property would not hold true.

Figure 11:
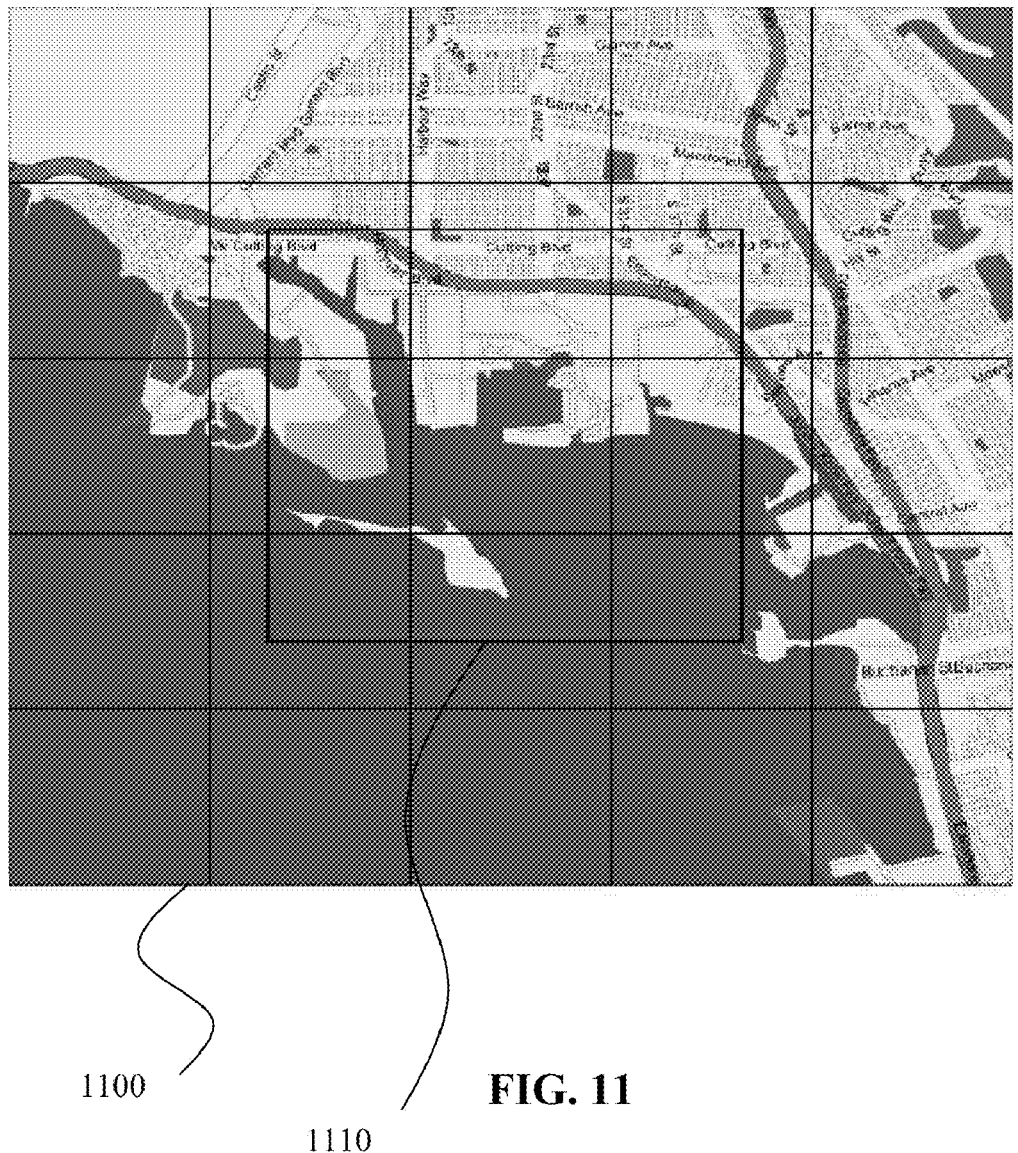
FIG. 11 illustrates an exemplary map image tile grid and clipping rectangle according to aspects of the present invention.
Figure 12:
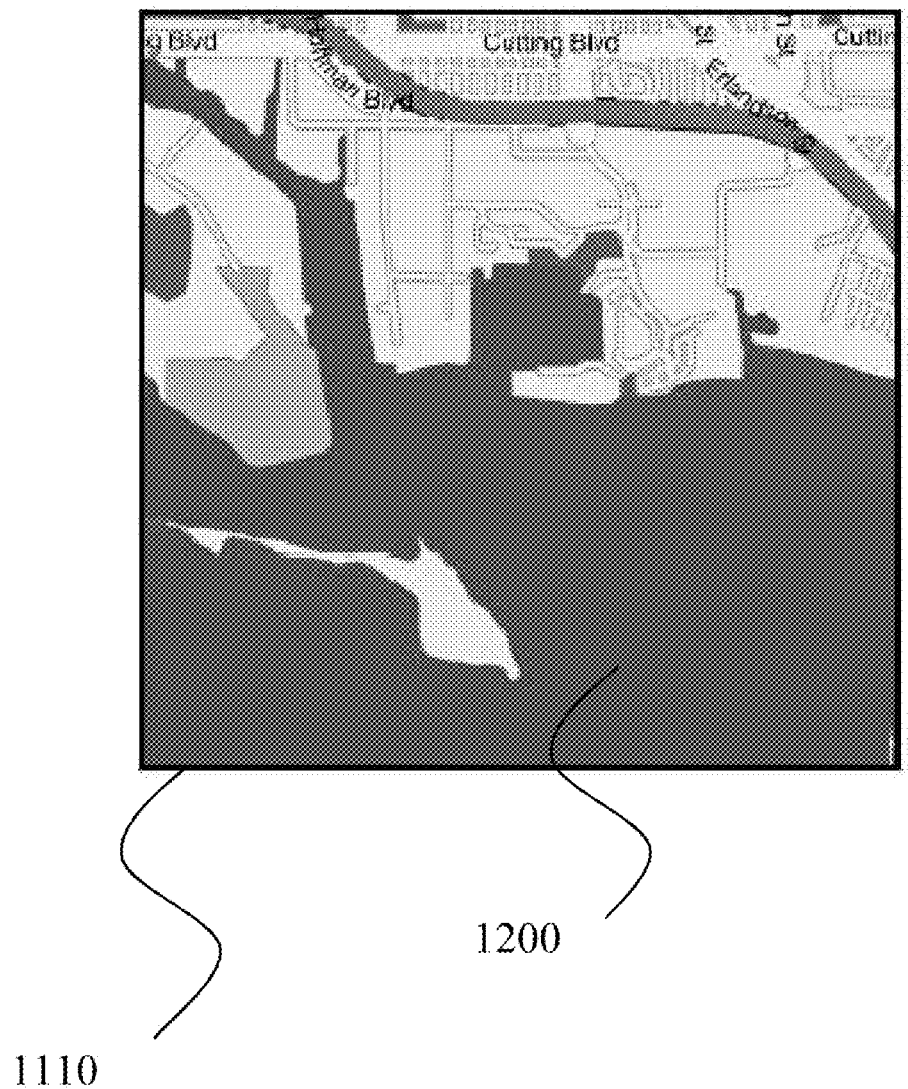
FIG. 12 depicts a resulting map image after comparing an exemplary tile grid with a clipping rectangle according to aspects of the present invention.
Figure 13:
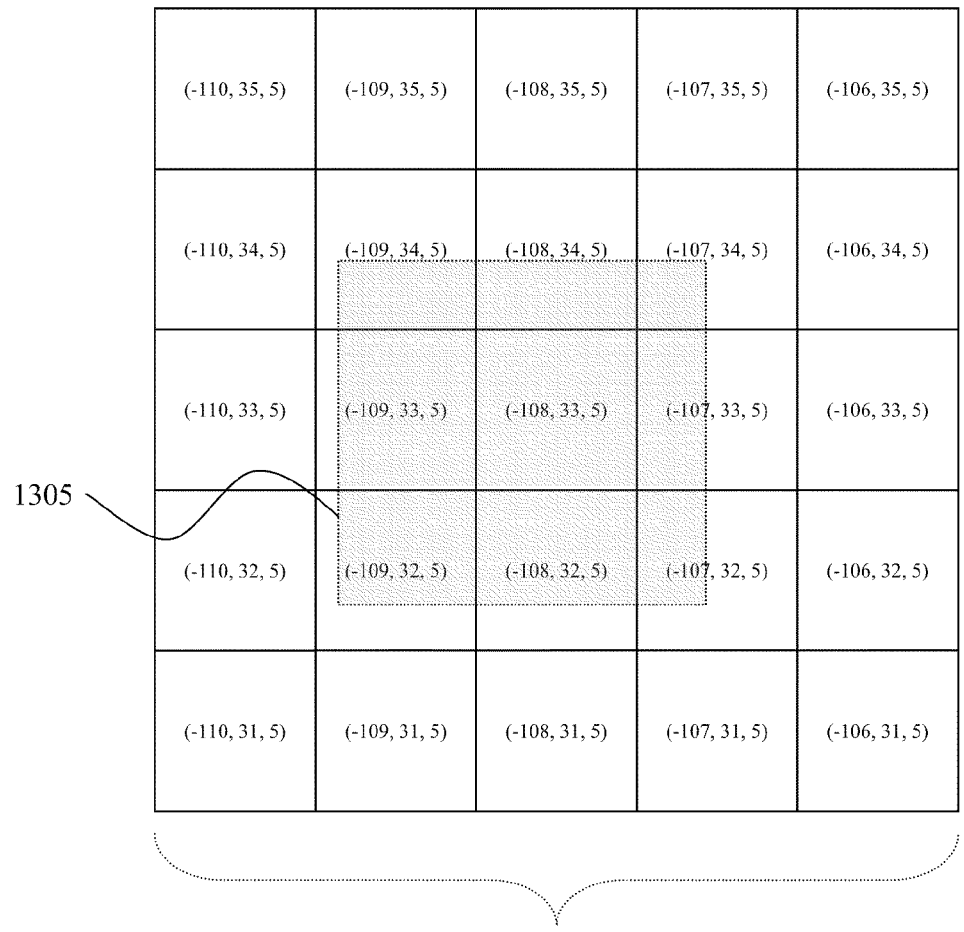
FIG. 13 illustrates the underlying tile grid coordinates and clipping shape corresponding to an exemplary set of displayed images according to aspects of the present invention.

Generally, the clipping shape remains fixed relative to the web browser's window 800, whereas client-side scripts according to aspects of the present invention will move the location of the tile grid relative to the clipping shape, in particular to pan the map image 805. FIG. 11 illustrates these two graphical elements, while FIG. 12 depicts the result of processing the tile grid through the clipping shape for display on a web page. As shown in FIG. 11, a square 5-by-5 tile grid array 1100 comprises 25 individual tiles (each of which is defined by red boundary lines). A square clipping shape 1110 (shown as a black rectangle) defines the subset of the tile grid that will be displayed as a map image on the client's web browser. In FIG. 12, the "clipped" tile grid array 1200 is displayed with boundaries that are contiguous with the boundaries of the clipping shape. As mentioned earlier, the map image 805 shown in FIG. 8 is also the result of a larger tile grid array that has been compared with a clipping shape. FIG. 13 illustrates the underlying tile grid coordinates and clipping shape 1305 that may correspond with a set of displayed images, such as those shown in FIGS. 11 and 12. In FIG. 13, each of the 25 tiles within 5-by-5 tile grid array 1300 is represented by a unique set of tile coordinates.

In one embodiment, the clipping shape is a rectangle of fixed size 300×300 pixels, and positioned at the center of the web page 800 as shown in FIG. 8. The clipping shape is implemented in one embodiment as a DIV element with style "overflow:hidden; position:relative" and id "mapView." The tile grid is of fixed size 5-by-5 tiles. It is implemented as a TABLE element with id "mapTable." Each of mapTable's 25 TD children contains a single IMG element, such that placing a tile simply entails appropriately changing the SRC attribute of the IMG element. The mapTable element is the child of a DIV element with id "mapDiv" and style="position:absolute." The POSITION styles of mapView and mapDiv makes it possible to move the tile grid relative to the clipping shape simply by changing the LEFT and TOP styles of the mapDiv.

In general, the size of the tile grid relative to the size of the clipping shape may depend on various implementation factors described below. Roughly speaking, the smallest grid of tiles that is at least twice the size (in both the width and height) of the clipping shape (in pixels) may be used. Again depending on implementation choices, it may be necessary to dynamically change the size of the tile grid when the user changes the size or shape of the clipping shape.

For the purpose of the following exemplary discussion, A and B represent the width and height, respectively, (in term of tiles) of the tile grid. Each position in the tile grid is assigned a coordinate pair (a, b) with the upper-left position having coordinates (0, 0), and the lower-right position having coordinate (A-1, B-1). During calculations, reference may be made to positions (a, b) that fall outside the tile grid, i.e., where a<0 or A≦a, or b<0 or B≦b.

In each map image produced in one embodiment, the intersection between the clipping shape and the tile grid will equal the full clipping shape, such that only map tiles are exposed to the user by the clipping shape. In the remainder of this document, this fact is denominated as the "intersection condition."

With the above assumptions and definitions in place, one may refer uniquely to any map view by the pixel coordinate triplet (x, y, z) of the map pixel exposed at the clipping shape's origin.

Initialization and Caching

In one embodiment, assuming that the user has requested an initial map view (x, y, z), and further assuming that the corresponding map pixel (x, y, z) belongs to tile (xx, yy, z), the client-side scripts proceed as follows. First, the tile grid is placed relative to the clipping shape in any manner that does not violate the intersection condition. Second, (a, b) is defined as the position of the tile grid now containing the clipping shape origin. Third, for each position (a+a', b+b') in the tile grid intersecting the clipping shape, the tile (xx+a', yy+b', z) is placed. Fourth, and finally, the resulting frame is displayed.

In general, placing a tile in a tile grid position in general will cause the browser to first check if the tile is present in its cache, and, if it is not, to issue the appropriate HTTP request for the needed tile. Depending on the particular host technology of a given implementation, this HTTP request may be performed synchronously or asynchronously. Embodiments of the present invention improve performance by encouraging web browsers to cache individual tiles locally. Thus, when the browser-side scripts instruct the browser to display a particular tile, the browser will request the tile from an HTTP server only when the tile is not already present in the browser's cache. In this way, embodiments of the present invention benefit from separate map views containing overlapping imagery, even if those separate views belong to different browser sessions. Indeed, once a user has viewed an area while on-line, the user may view that same area while off-line, so long as only tiles already cached by the user's browser are needed.

To achieve this effect, the client-side scripts in one embodiment identify each tile separately by a URL ("universal resource locator") that depends only on the coordinate triplet of the tile (e.g., http://somedomain.com/tiles?x=0&y=0&z=0). In general, web browsers manage their caches by using an expiration time contained in the HTTP response containing each tile, and/or by comparing a last modified time of the tile in the browser's cache with that of the tile on the server side. Since the latter of these two methods requires a somewhat costly HTTP-request even when a cached tile should be used, the HTTP server transmitting the tiles may be configured to report a lengthy expiration period, determined heuristically given the following trade-off: On one hand, a longer expiration period tends to minimize the number of HTTP requests needed for correctly cached tiles. On the other hand, a shorter expiration period makes it faster to promulgate new tiles to the web browsers when the large map input rasters change (which in practice could occur to compensate for new road construction, or to take advantage of an improvement to the map drawing system that produces the rasters).

Alternatively, an implementation may add a version number to the tile URLs (e.g., http://www.somedomain.com/tiles?x=0&y=0&z=0&v=1.0), configure the HTTP-server transmitting the tiles to report an expiration date as far as possible into the future, and use some other means of transmitting a new tile version number to the browser-side scripts only when new tiles needs promulgation. This alternative system minimizes the HTTP requests issued by the browser for tiles already correctly cached, while giving full control of when new tiles should be used in place of old cached ones. This alternative, however, does tend to use more disk-space on the browser-side, as new tiles would not replace old ones in the browser's cache. Note that embodiments of the present invention do not depend on the use in particular of HTTP to transport the tiles from a server to the web browser. Other transport protocols supported by the browser can be used instead, such as HTTPS or FTP. As persons skilled in the art will recognize, each transport protocol may require a slightly different approach to caching tiles. Embodiments of the present invention may also implement heuristic algorithms, based on recent pan and zoom operations, to predict which tiles are likely to be needed in the near future, and to use idle time and/or bandwidth to transfer those tiles into the browser's cache. As an alternative, idle time and/or bandwidth may be dedicated to updating positions in the tile grid that are not currently visible, and/or to request tiles that would be needed if the user were to requests single-level zoom transitions.

Figure 14:
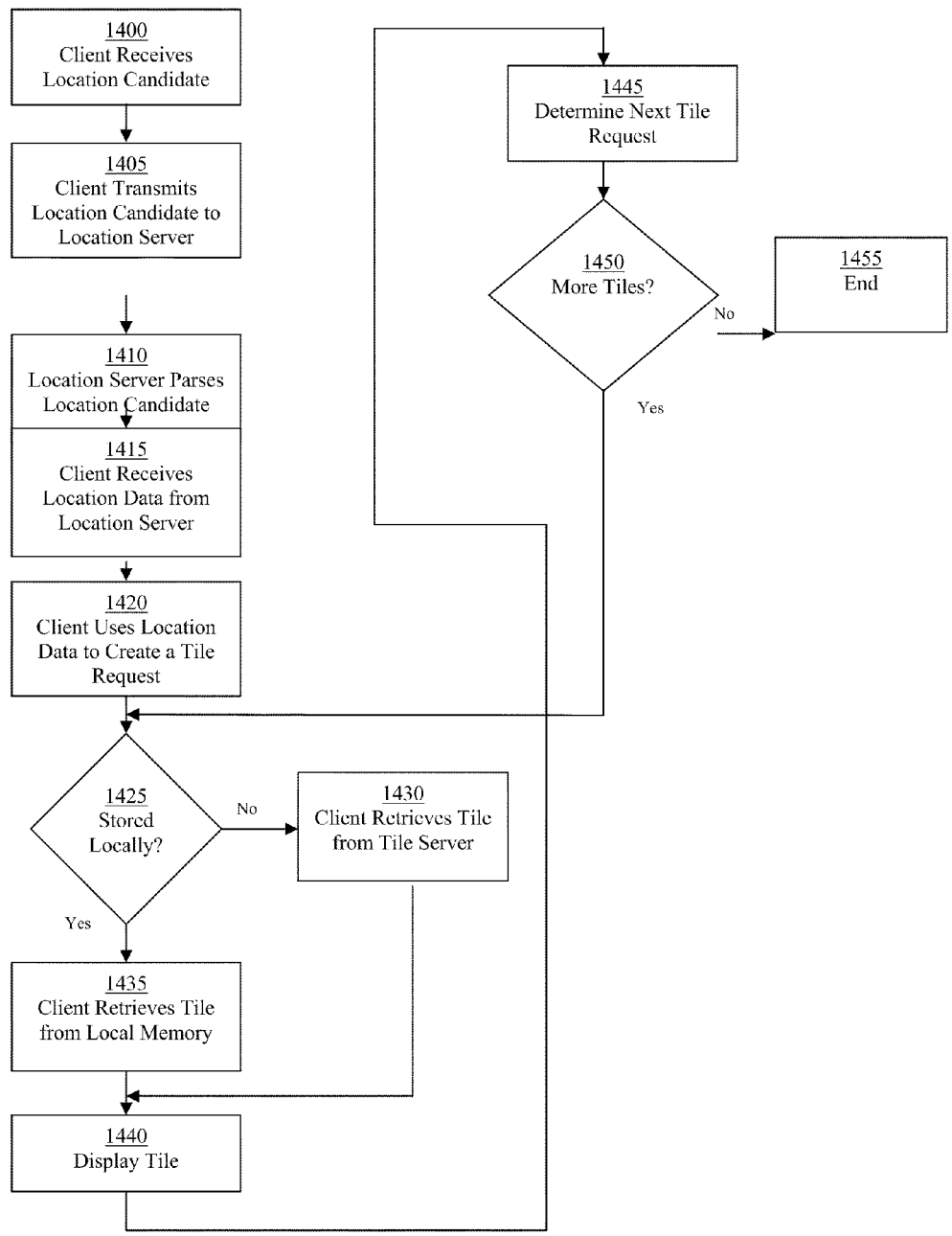
FIG. 14 illustrates a flowchart of one embodiment for transmitting map tiles to a web browser and caching the tiles locally at the web browser according to aspects of the present invention.

FIG. 14 illustrates a flowchart of one embodiment for transmitting map tiles to the web browser and caching the tiles locally at the web browser. At step 1400 the client receives a location candidate (e.g., the user may have entered a location to be mapped into text entry field 825 shown in FIG. 8 and then selected search button 830 in FIG. 8). Next, at step 1405, the client computing device transmits the location candidate to a location server (e.g. location data server 1000 shown in FIG. 10, location data server 520 shown in FIG. 5, or server 710 shown in FIG. 7). The location server then parses the location candidate at step 1410, resulting in the generation of location data. At step 1415 the client receives this location data from the location server, and at step 1420 the client uses the received location data to create a tile request. For each tile in the tile request, the client determines whether the requested tile is already stored locally. Specifically, at step 1425, the client determines whether the requested tile is already stored locally.

If the tile is already stored locally, at step 1435 the client retrieves the tile from its local memory. Alternatively, if the tile is not already stored locally, at step 1430 the client retrieves the tile from a tile server (such as tile server 515 shown in FIG. 5). At step 1440, once it has been retrieved from either local or remote tile storage, the requested tile is displayed. Next, at step 1445, the next tile request is determined. If more tiles remain in the request (a determination that is made at step 1450), the process loops back to step 1425, where a determination is made as to whether the newly requested tile is already stored locally. Alternatively, if no more tiles remain in the request, the process ends at step 1455.

It should be noted that most target host technologies offer access to asynchronous HTTP requests. This feature allows client-side scripts to place a tile in the tile grid during a pan transition, and then to start moving the tile grid before the tile actually arrives, thus temporarily exposing the wrong tile (or, alternatively, an empty space or a blank tile) to the user. In general, depending on the particular requirements of a given implementation, such asynchronicity may be deemed preferable to the lengthy latency that might result from always waiting for all new tiles to arrive before moving the map. In some embodiments, it may be beneficial to replace old tiles in the tile grid with a static tile unicolored with the map's background color (and presumably almost always in the browser's cache) before issuing the asynchronous request. Alternatively, a more complex implementation may wait until either the arrival of all new tiles or the expiration of some short timeout period (whichever occurs first) before starting to move the map. In such an implementation, the unicolored tile would be used only in the timeout case.

Overlays

According to one embodiment, all additional information beyond the fundamental map image (e.g., driving routes, specific locations) can be drawn as overlays and placed on top of a map on the client side. This approach can be used for all additional information, which means that the server does not need to draw any maps with specific additional information on demand. Overlays can be used, for example, to display location markers and routes, and to highlight streets and particular areas. As persons skilled in the art will recognize, overlays may be implemented in various ways (e.g., through images or vectors). For example, client-side JavaScript may place HTML elements on top of the map display. In terms of the code snippet described earlier, all overlay elements may be placed in mapDiv, such that they move automatically with the map when mapDiv is moved. Some of these overlay elements may already be in the HTML code (with style="display:none") when the web page is first loaded, while others may be added later via JavaScript code.

Figure 15:
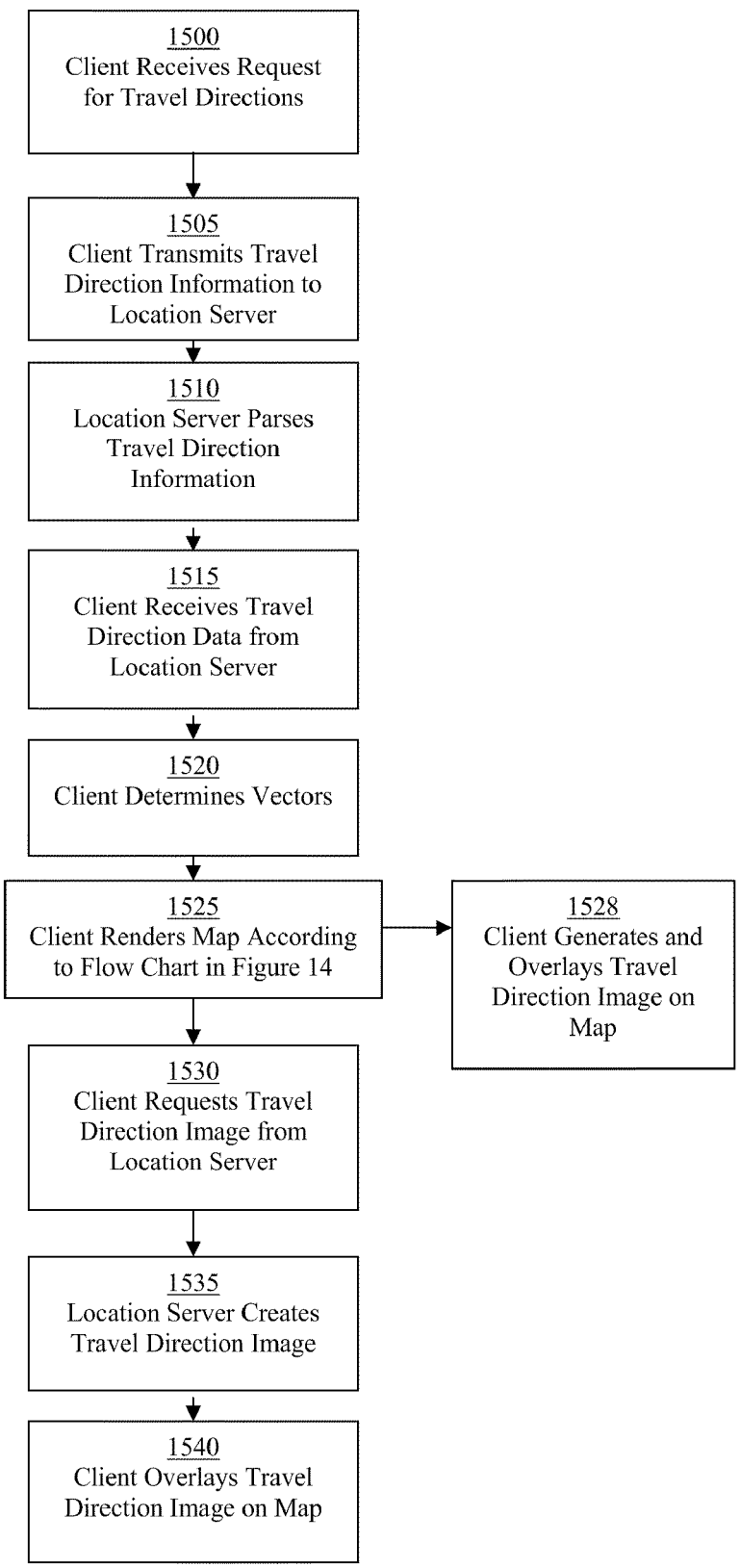
FIG. 15 illustrates a flowchart that may be used according to one embodiment for displaying driving directions as an overlay onto a map image.

FIG. 15 illustrates a flowchart that may be used according to one embodiment for displaying driving directions as an overlay onto a map image. At step 1500, the client receives a request for driving directions from a user in the manner that has already been described. At step 1505, the client transmits the requested travel direction information to a location server. At step 1510 the location server parses the travel direction information, as described earlier in reference to the description of the functionality of the front end server. At step 1515, the client receives textual and geographical travel direction data from the location server, as described earlier. At step 1520, the client determines the vectors required to display an overlay driving directions route trace onto a map image. At step 1525, the client renders the fundamental map image (if this step has not already been done) in accordance with the flowchart of FIG. 14, as described earlier. In one embodiment, at step 1528, the client then renders the driving directions route trace as an overlay onto the fundamental map image. In another embodiment, instead of proceeding to step 1528, at step 1530 the client requests a travel direction image overlay from the location server, based on the vector information that was calculated by the client at step 1520. In this embodiment, at step 1535, the location server creates a travel direction image and transmits it to the client. Finally, at step 1540 in this embodiment, the client overlays the final travel direction image onto the map image. An exemplary displayed map image with an overlay driving directions image is shown in FIG. 26.

In certain implementations, specific web browsers (e.g. Mozilla/Firefox) may not be capable of drawing vector graphics as described above. In such implementations, a resource such as geomap server 1010 shown in FIG. 10 may generate an overlay bitmap image (e.g., for a polyline associated with a set of driving directions), and then the browser may composite this transparent image onto the map image. Because the browser requests this image directly from the geomap server 1010 in this example, the request is via a URL instead of a protocol buffer. The width and color of the line may be specified as command-line options to the geomap server 1010.

Panning

In one embodiment, map image panning operations may be implemented as follows. First, suppose that the user has requested a pan from one map view (x, y, z) to a new map view (x', y', z) on the same zoom level, and suppose that the pan should be animated over n frames (where n=1 indicates that the switch from the old to the new view should take place in a single step, while higher values of n indicate that the switch should be presented as a smoother, animated pan). Further, assume that the two map views are "close" to each other relative to the size of the tile grid, in the sense that, along both the x and y axes, the distance between the two views plus the size of the clipping shape is smaller than the size of the tile grid (in pixels).

With the above assumptions and definitions in mind, the operation of 'rotation down' of the tile grid is defined as taking the bottom row and making it the top row, and then placing the resulting grid such that the remaining positions retain their old location relative to the clipping shape. Likewise, 'rotating up' is defined as making the top row the bottom one, 'rotating left' as making the left column the right one, and finally 'rotating right' as making the right column the left one. These rotation operations are used in cases where moving the tile grid would otherwise violate the intersection condition. There are of course other manners in which the same effect could be achieved (for example by shifting each tile in the grid one location), but above operational definitions have been found to be efficient. The client-side scripts thus proceed as follows. First, let (dx, dy)=(x, y)−(x', y'), and let (a, b) be the position of the tile grid now containing the clipping shape origin. Second, for each position (a+a', b+b') that would intersect the clipping shape if the tile grid was moved by an offset of i*(dx, dy)/n for any integer i between 1 and n, place the tile (xx+a', yy+b', z) in position ((a+a') mod A, (b+b') mod B). Third, if necessary, rotate the tile grid until the intersection condition would not be violated by moving the tile grid by an offset of (dx, dy). Fourth, for each i between 1 and n, move the tile grid by an offset of (dx, dy)/n and display the resulting frame. Depending on the host system's efficiency, it may be necessary to pause for some time period between frames. Persons skilled in the art will recognize that the order of the second and third steps in this process may be reversed. Also, note that a slight relaxation in the second step by assuming that n equals 1 would result in a near correct presentation (although some intermediary frames may lack a few tiles when the pan is neither horizontal nor vertical). Persons skilled in the art will also recognize that the above process will present a smooth pan along contiguous map imagery.

Figure 16:
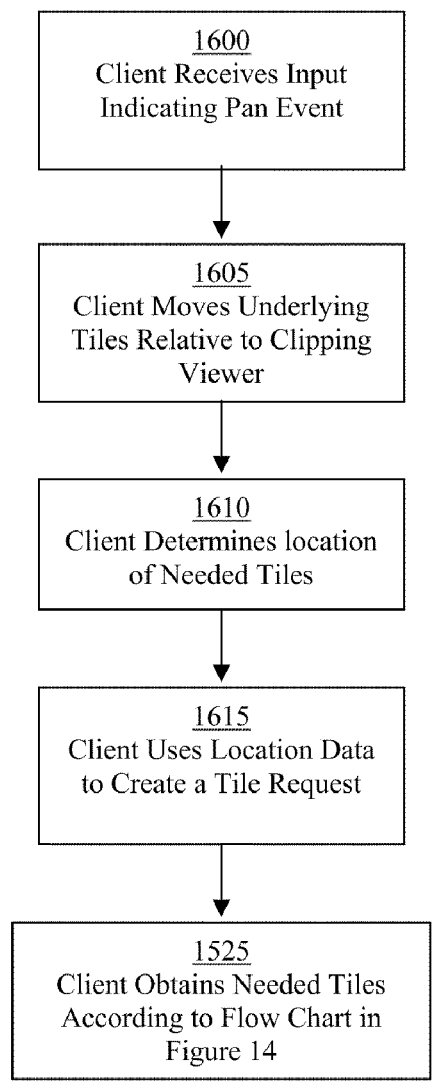
FIG. 16 depicts a flow chart for performing a map image panning operation according to one embodiment of the present invention.

FIG. 16 depicts a flow chart for performing a map image panning operating according to one embodiment. At step 1600, the client receives a command from the user indicating a pan event (e.g., by activation of a directional control object 815 as shown in FIG. 8). At step 1605, the client virtually moves the clipping viewer relative to the underlying map tiles. Then, at step 1610, the client determines the location of newly needed tiles as a result of the pan operation. Once this has been determined, at step 1615 the client uses this location data to create a tile request. Finally, at step 1525, the client obtains any required tiles in accordance to the process illustrated in FIG. 14 and described earlier.

Figure 17:
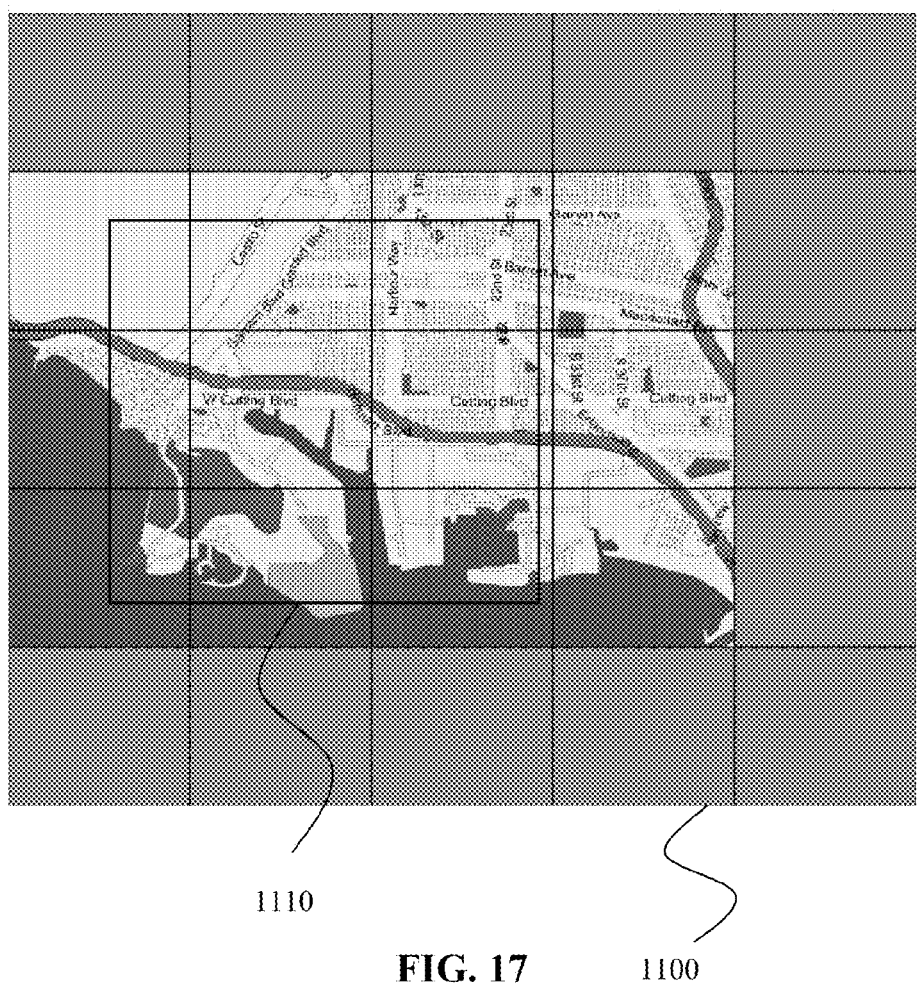
FIGS. 17 through 21 illustrate an exemplary process of panning west by ⅓ of the clipping shape's width according to one embodiment of the present invention.
Figure 18:
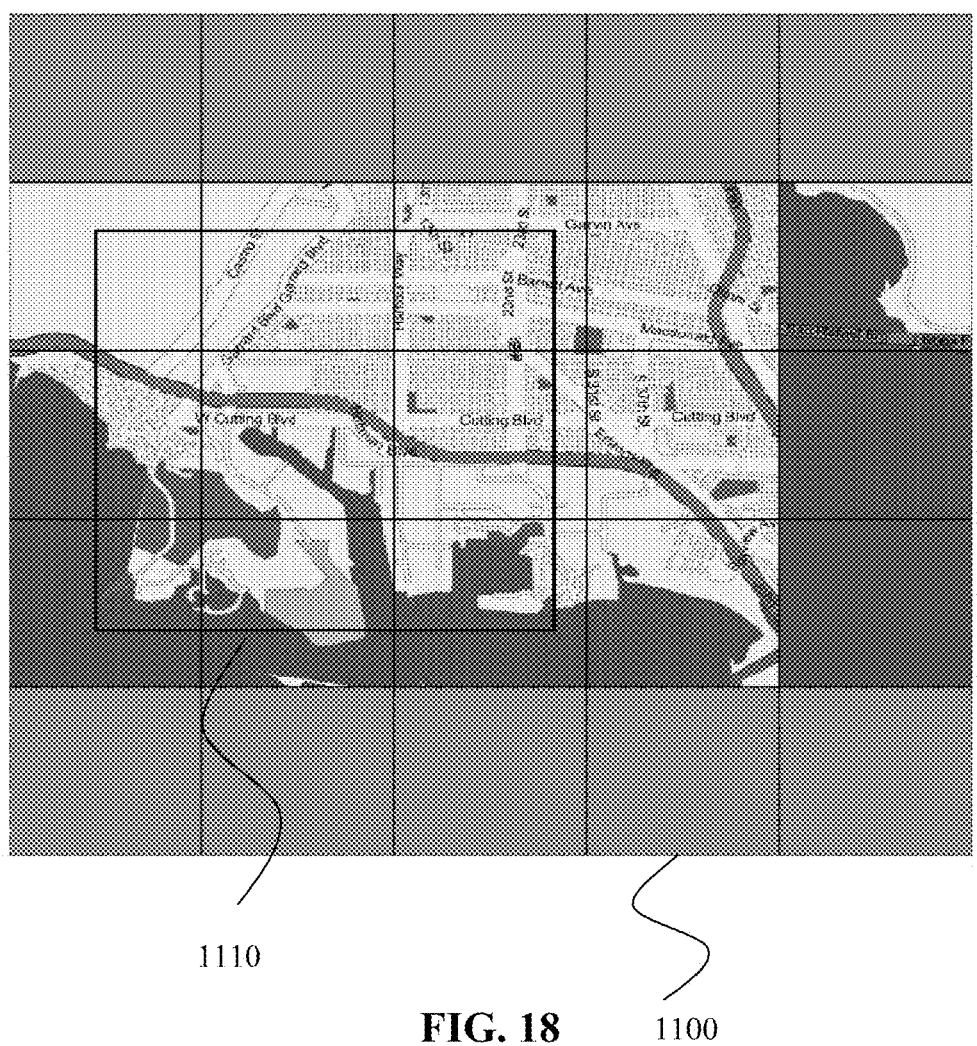
Figure 19:
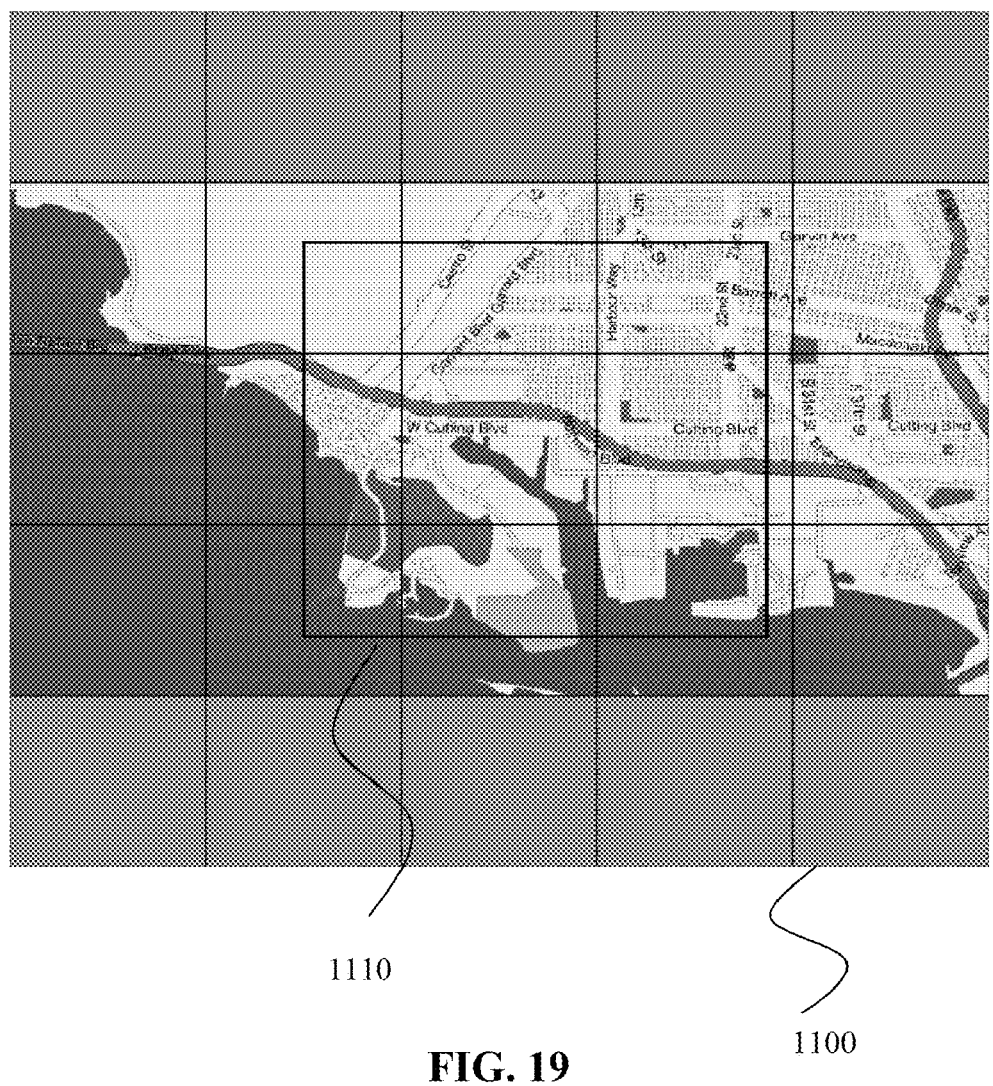
Figure 20:
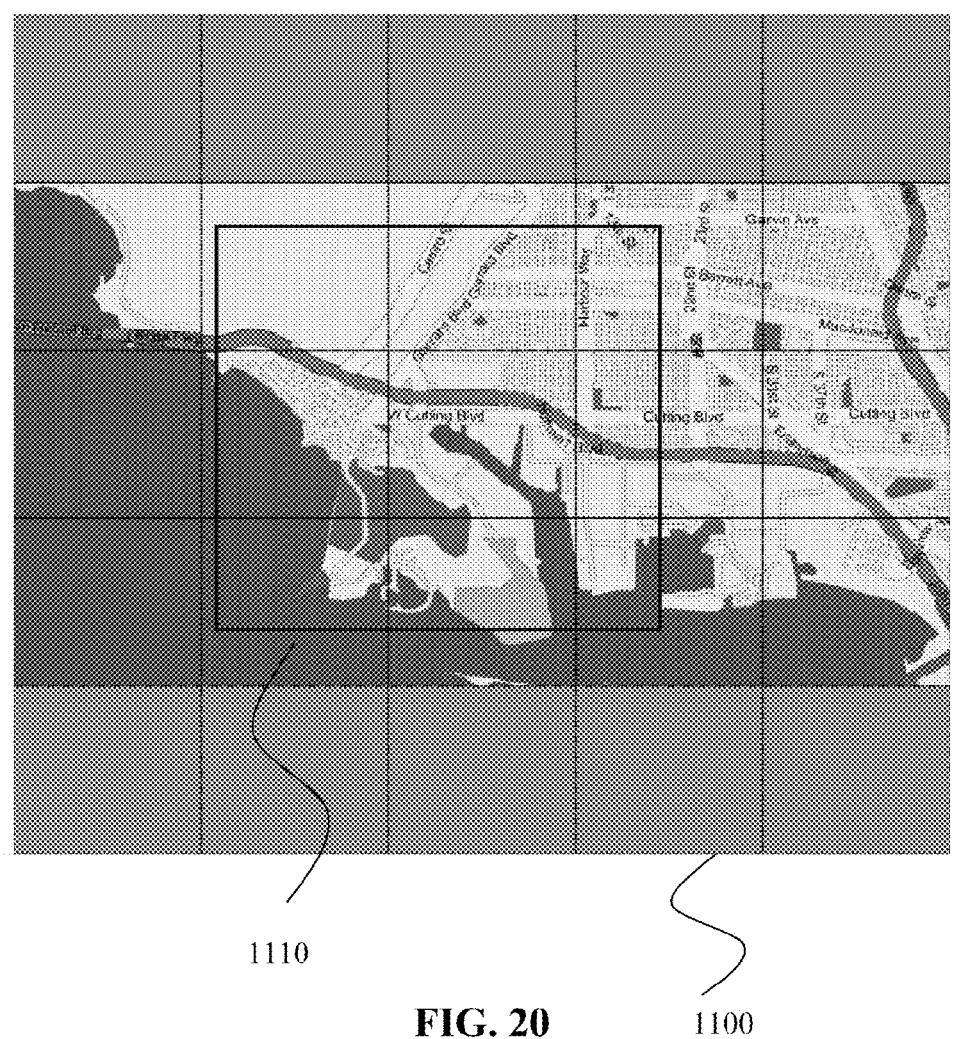
Figure 21:
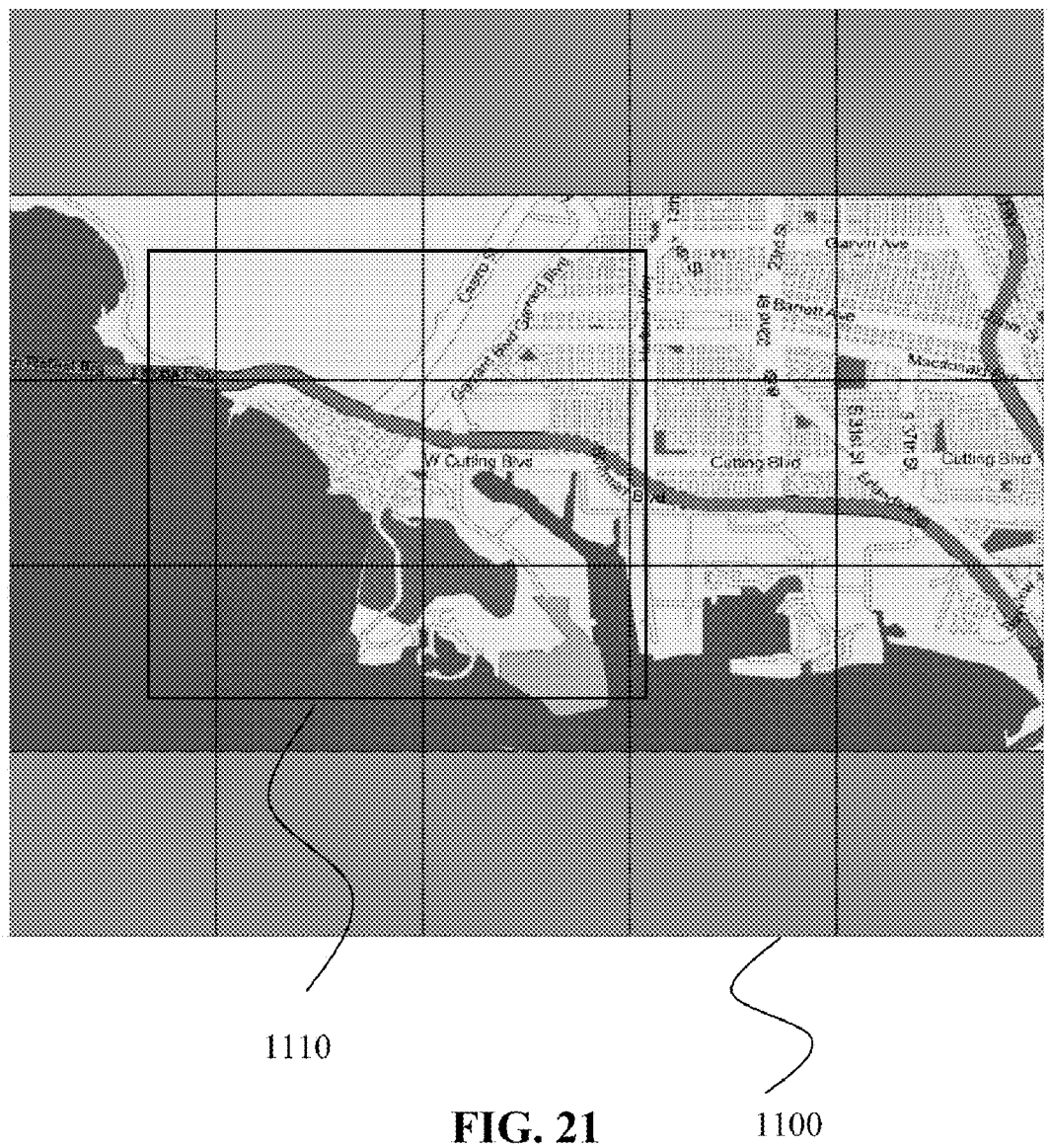

FIGS. 17 through 21 illustrate an exemplary process of panning west by ⅓ of the clipping shape's width according to one embodiment. FIG. 17 depicts the state of the map image and tile grid before the tiles are updated in the second step of the process described earlier, while FIG. 18 depicts the state after this updating step has been completed. FIG. 19 depicts the state after one "rotate right" operation has been performed according to the third step described earlier, while FIG. 20 depicts the state after a few frames have been displayed in the fourth step. Finally, FIG. 21 depicts the final state after the panning process is complete.

Persons skilled in the art will recognize that a larger grid in general allows for longer pans to be presented smoothly using the above process. In one embodiment, the implementation choice of using a grid slightly more than twice the size of the clipping shape allows for smooth pans of up to the size of the current map view. To perform longer pans without increasing the size of the tile grid, the entire pan operation may simply be divided into a series of smaller pan operations, although this approach may result in a slightly less smooth presentation.

The above exemplary panning operation algorithm updates all necessary tiles before presenting even the first frame of the animation. This approach may introduce a small latency between the time that the user makes a request and time that the map actually starts. To overcome this, an implementation may choose to divide an n-frame pan into, say, n separate 1-frame pans. This technique alone, however, may result in a less smooth presentation, as the amount of work to produce each frame may vary significantly with the number of tiles requiring update. A more sophisticated implementation overcomes this problem by predictively updating tiles needed for future frames to even out the number of tiles requiring update among the frames.

Zooming

In one embodiment, "zooming" refers to the transition between two views (x, y, z) and (x', y', z'), where z≠z', and where the lat/lon values corresponding to the two views are close relative to the size of the clipping rectangle. The following discussion focuses on zoom operations that are "vertical" around a lat/lon "anchor" in the sense that the pixel containing the anchor occupies in each of the two views the same pixel of the clipping shape. Typically, the anchor of a zoom operation might be the center of the clipping shape, but it could also be the lat/lon of a location marker (such as marker 845 shown in FIG. 8), the lat/lon corresponding to a pixel selected by the user, or any other location within a map image. It should be noted that transitions that combine panning with zooming operations may be combined in certain implementations.

In general, zooming is a more expensive operation than panning in terms of tile updates, as every tile intersecting the clipping shape must be updated. For this reason, and because a smoothly animated zoom requires costly image scaling operations, one embodiment performs all zooming in a single frame, simply by performing the initialization steps that were described earlier.

The following discussion outlines an approach to presenting a smoothly animated zoom operation to the user according to one embodiment, which is feasible in certain exemplary host technologies (e.g., Flash and Java Applets). For simplicity, assume that the scaling factor difference between the two zoom levels z and z' is exactly 2, that z'=z+1, and that it is desired to present the transition over n animation frames. In this discussion, a "final frame" refers to the frame that would be produced by simply zooming in a single frame using the initialization steps that were described above. Further, let s (the scaling factor) equal the n'th root of 2.

With these definitions and assumptions in mind, one embodiment of a zooming algorithm proceeds as follows. First, the final frame is assembled (but not displayed). Second, for i between 1 and n−1: (a) the tiles needed for the final frame are scaled by a factor of s^(n−i); (b) the scaled tiles are placed such that the anchor is correctly located; and (c), the resulting frame is displayed, and a pause is included if appropriate. Third, the final frame is displayed.

Alternatively, if z'=z−1, the tiles of the current view may be scaled instead of the tiles of the final view, as follows. First, as above, the final frame is assembled (but not displayed). Second, for i between 1 and n−1: (a) the tiles of the current view are scaled by a factor of s^(i); (b) the scaled tiles are placed such that the anchor is correctly located; and (c), the final frame is displayed, and a pause is included if appropriate.

Note that in the second step (part (a)) of both of the above implementations, scaling is only required for those tiles that will eventually be exposed through the clipping shape after part (b) of the second step is performed. Note also that the first step of the second implementation can be deferred until the third step. In both of these implementations, all intermediary frames are produced using the tiles of the higher zoom-level, as fewer tiles are needed in higher zoom levels to cover the same geographic area. A more involved alternative implementation seeks to produce some of the intermediary frames by using tiles from the lower zoom-level, or by alpha-blending scaled tiles from both the current and final frames to produce a "morphing"-like effect. Also, zoom transitions across multiple zoom levels may be implemented as a series of single-level transitions.

Figure 22:
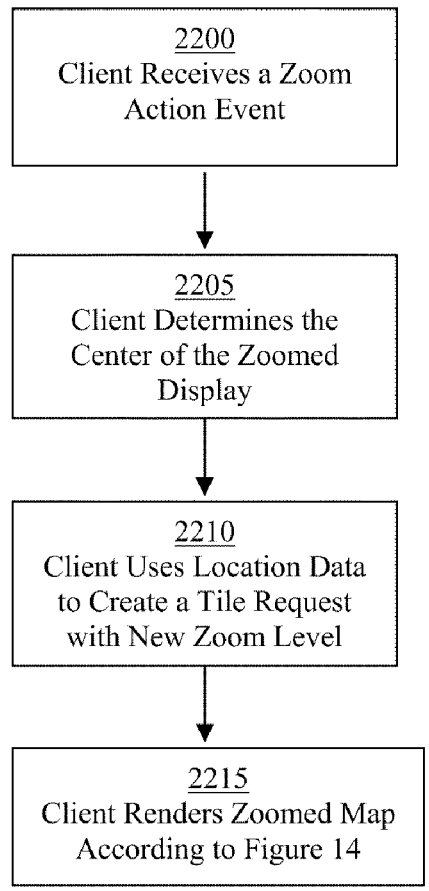
FIG. 22 depicts an exemplary flow chart for implementing a zooming operation according to one embodiment of the present invention.

FIG. 22 depicts an exemplary flow chart for implementing a zooming operation according to one embodiment. At step 2200, the client receives a zoom action event (e.g., by activation of a zoom control object 820, as shown in FIG. 8). At step 2205, the client determines the center of the zoomed display. Then, at step 2210, the client uses the determined center location data to create a tile request with the new zoom level. Finally, the client renders the zoomed map according to the process described earlier, with reference to FIG. 14.

Sliding and Jumping

The following discussion considers transitions between map views that are too distant for smooth zooming and panning alone. For example, a current map view may display a street in Berkeley, Calif., but the user may select a navigation shortcut or request a view of a street in downtown Manhattan, N.Y. Two exemplary approaches to this situation are presented, denominated as "sliding" and "jumping."

In accordance with the "sliding" approach of one embodiment, client-side scripts assemble the final view and (typically utilizing a separate tile grid) smoothly slide it onto the current view from the direction of the new view relative to the old view. Alternatively, in accordance with the "jumping" approach of one embodiment, client-side scripts first zoom out, then pan, and finally zoom back down the target view. The client-side scripts zoom out to and conduct the pan at the lowest zoom level that makes the pan short enough (in pixels) for the requirements of each particular implementation. A more sophisticated embodiment converts this "box-shaped" motion (i.e., zoom up, pan, zoom down) into a smoother, curve shaped motion. Persons skilled in the art will recognize that the "jumping" approach requires a much greater number of tiles and more computing resources than does the "sliding" approach.

Resizing

Depending primarily on the web site surrounding the map view, a user may request that the map view change size and/or shape. Depending on an implementation's choice of how to relate the size of the tile grid to the size of the clipping shape, this request in turn may necessitate resizing the tile grid. There are numerous possible implementations for this operation, including but not limited to the following. Assume that the current view is (x, y, z), that the corresponding pixel belongs to tile (xx, yy, z), and that the resizing of the clipping shape should take place around its origin. Then, the first step is to resize/reshape the clipping shape. Next, if necessary, the size of the tile grid is moved and increased (e.g., by adding a row to the bottom and/or columns to the right) to the smallest size necessary so as not to violate the intersection condition. Next, let (a, b) be the position of the tile grid now containing the clipping shape origin. As the next step, for each position (a+a', b+b') in the tile grid intersecting the clipping shape, place the tile (xx+a', yy+b', z). Next, the frame is displayed. Finally, if necessary, the size of the tile grid is increased (e.g., by adding rows to the bottom and/or columns to the right) such that the tile grid is again at least twice the size of the clipping shape. The resizing transition can be animated using the same techniques as animating pan transitions, as described earlier. Also, note that, if desired for a particular implementation, the final step of increasing the tile grid may be combined into the initial step of moving and increasing the size of the tile grid. Persons skilled in the art will recognize that the origin has been chosen arbitrarily in the above discussion, and that one cannot count on this condition being true in general. However, the steps described above may be easily adjusted by persons skilled in the art to account for this additional complexity.

Location Markers

Figure 23:
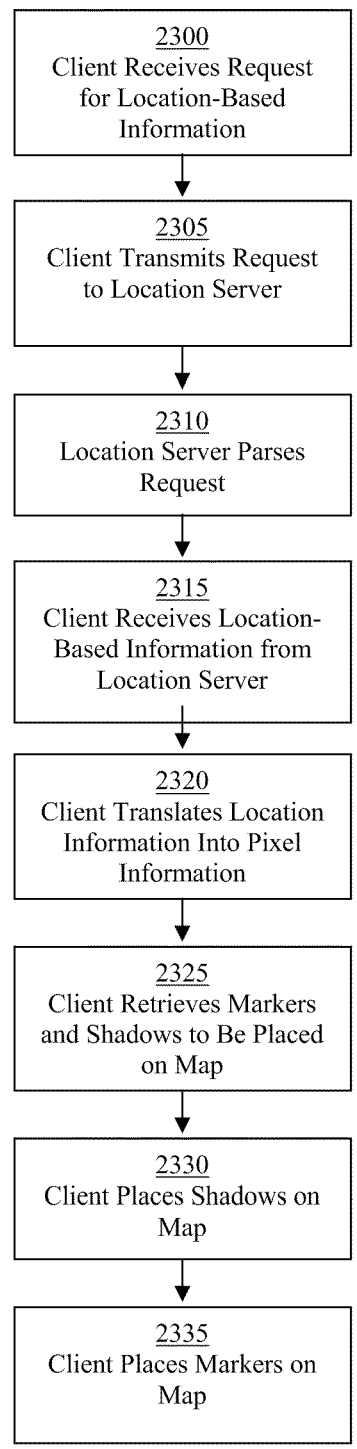
FIG. 23 depicts an exemplary flow chart for overlaying a set of location markers onto a map image according to one embodiment of the present invention.
Figure 24:
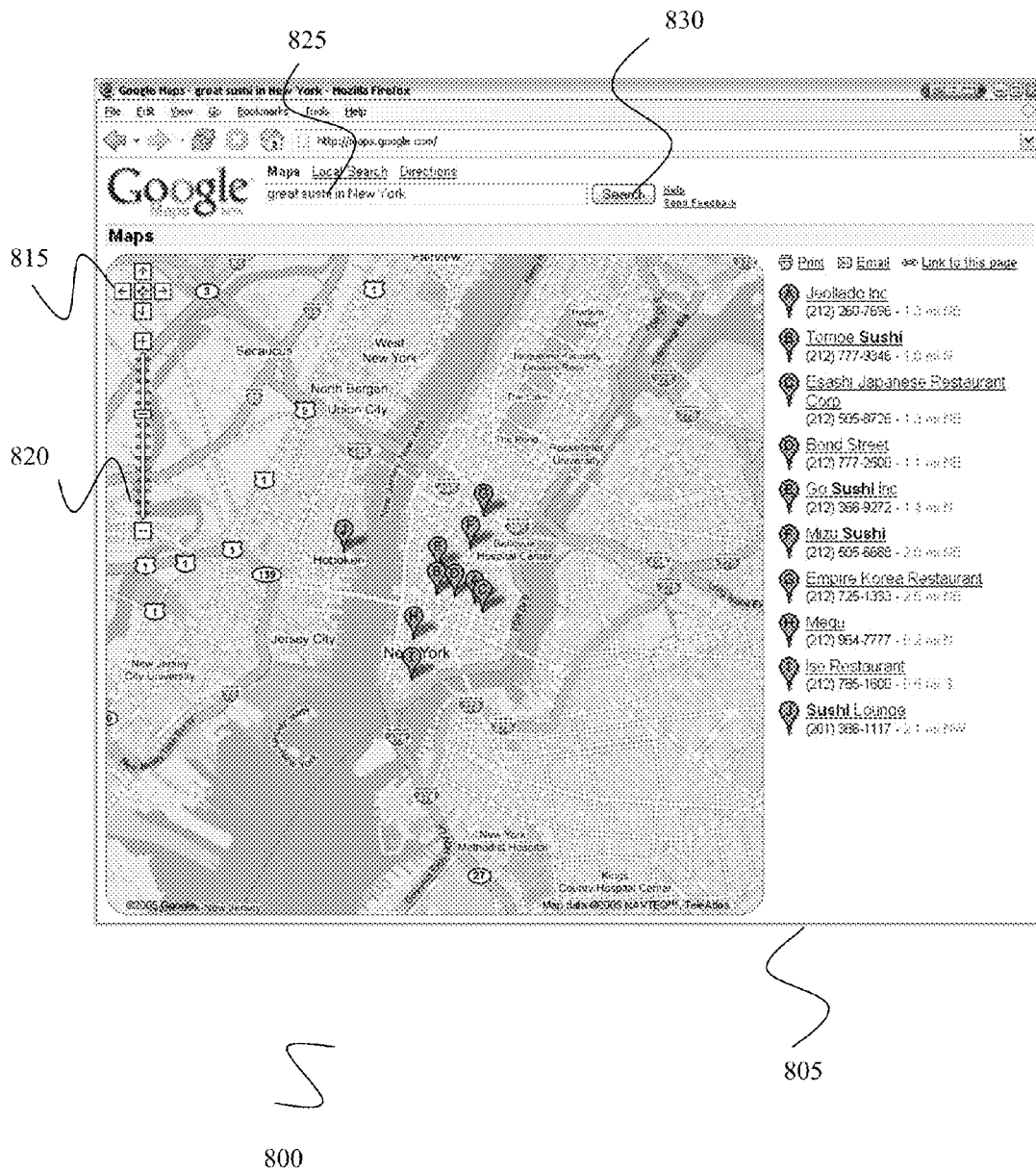
FIG. 24 depicts an exemplary map display web page with multiple overlaid location markers according to aspects of the present invention.

As mentioned earlier, location markers according to one embodiment (along with other objects, such as information windows) can be overlaid onto the map image with corresponding shadows, which makes it easier to identify their relative locations. In one embodiment, the shadows can be drawn to appear as if the location markers are standing vertically on a map that is tilted at a 45° angle, stretched by a factor of the square root of two, and projected back onto a vertical plane. Such shadows can make location the markers appear to have been placed on the map in a three-dimensional manner, a feature that helps users to identify the locations pointed to by the location markers in a more precise manner, and also helps to prevent multiple markers from interfering with each other. In addition, location markers may be represented by PNG files with an alpha channel containing anti-aliased markers overlaid onto the map image. FIG. 23 depicts an exemplary flow chart for overlaying a set of location markers onto a map image according to one embodiment of the present invention. At step 2300, the client receives a request from the user for location-based information. Then, at step 2305, the client transmits the request to a location server in the manner that has been described previously. At step 2310, the location server parses the request. Next, at step 2315, the client receives location-based information from the location server. At step 2320, the client translates this information to a set of pixel information. Then, at step 2325, the client retrieves marker and shadow images (either locally or from the remote location server) to be overlaid or otherwise placed onto the map image. At steps 2330 and 2335 (which can obviously be reversed if so desired for a particular implementation), the client places shadows and markers, respectively, onto the map image (e.g., by overlaying them onto the map image). FIG. 24 depicts an exemplary map display web page with multiple overlaid location markers (denominated as "A" through "J"), displaying the results of an exemplary request in text field 825 for "great sushi in New York") according to aspects of the present invention.

As another example of overlaid images, FIG. 27 depicts an exemplary map display web page with an overlaid driving direction route trace according to aspects of the present invention. FIG. 27 includes a first text entry field 825 for indicating the desired the start address, a second text entry field 828 for indicating the end start address, a highlighted overlaid route trace 2710 corresponding to the desired driving directions, a corresponding set of textual driving directions 2730, a location marker 845 and its shadow 855 indicating the end point of the driving directions, a similar location marker and its shadow 855 indicating the start point of the driving directions, and an information window 2720 and its shadow 855 displaying a detailed map view 2725 for a specific selected maneuver (e.g., "Take the Moffett Blvd." exit") along the route. Similarly, FIG. 28 depicts an exemplary map display web page with an overlaid area boundary trace according to aspects of the present invention.

Figure 26A:
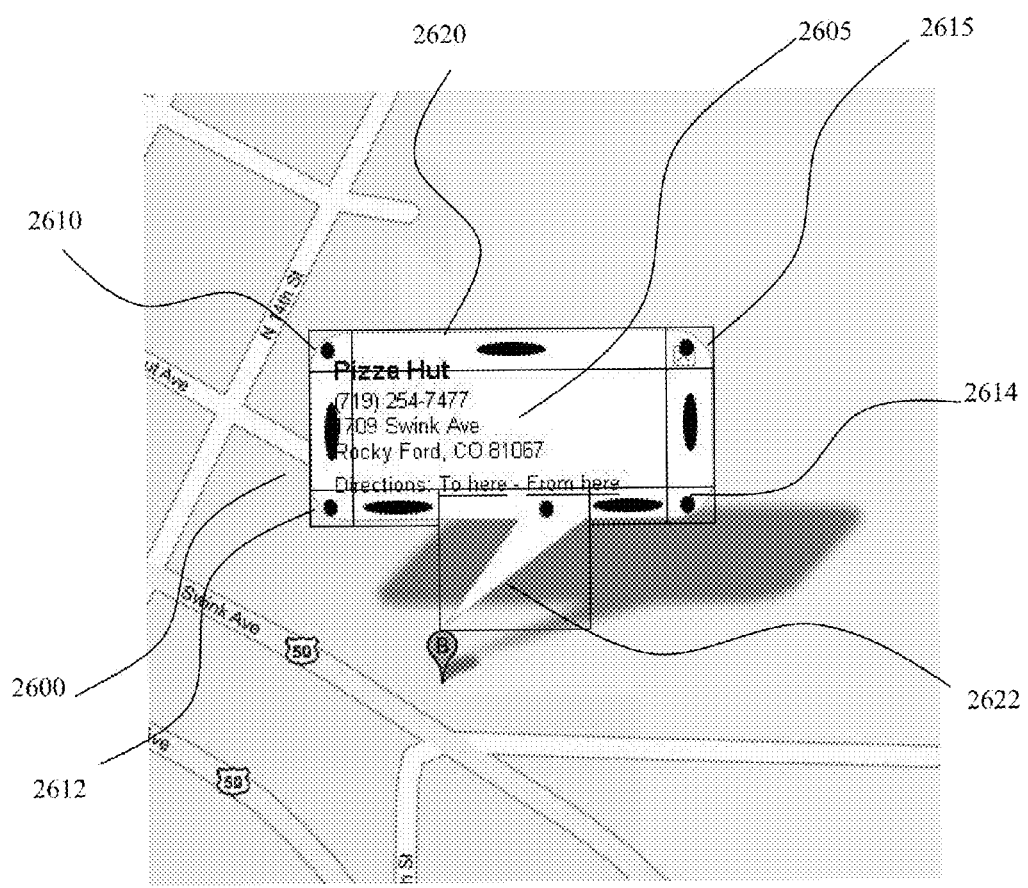
FIG. 26A depicts exemplary details of an information window according to aspects of the present invention.
Figure 29:
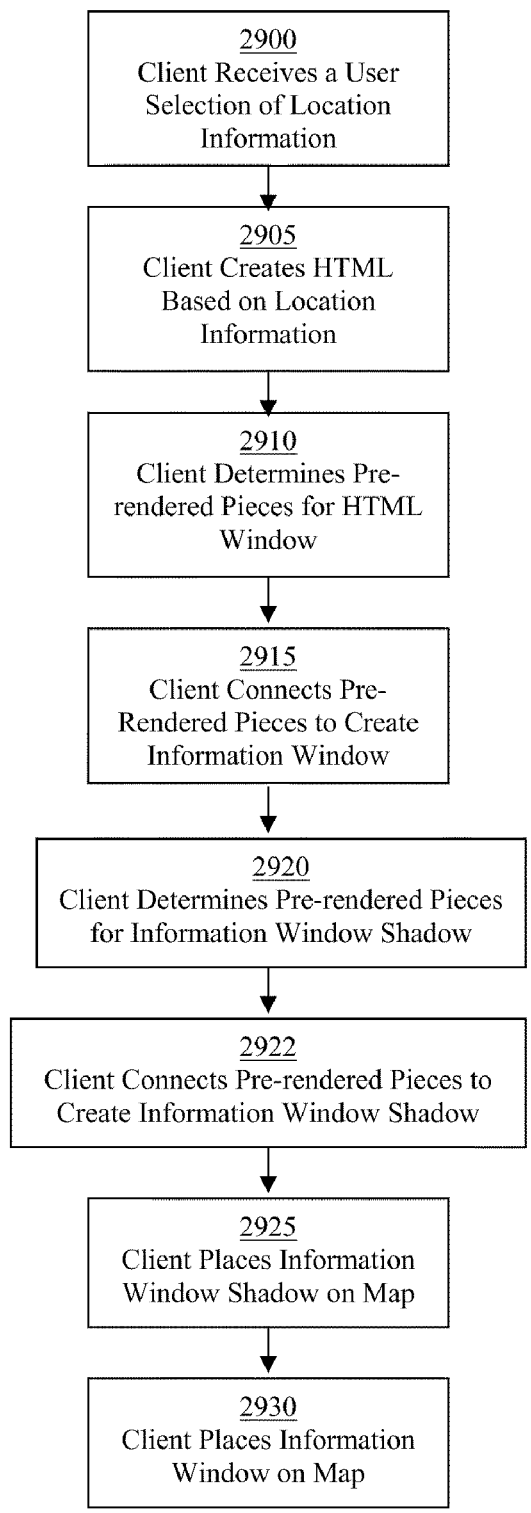
FIG. 29 depicts an exemplary flow chart for overlaying a set of information windows onto a map image according to one embodiment of the present invention.

FIG. 29 depicts an exemplary flow chart for overlaying a set of information windows (such as information window 840 and its shadow 855 shown in FIG. 8) onto a map image according to one embodiment of the present invention. At step 2900, the client receives a user selection of location information (e.g., if a user selects a driving maneuver that was generated as a result of a driving direction query). At step 2905, the client creates corresponding HTML code based on the location information. For example, the HTML code may be created by using XSLT (a common script language available in Internet Explorer or other commercially available web browsers) to convert XML code containing the location information into HTML. The created HTML code may then be inserted into a table, such as HTML table 2605 shown in FIG. 26A. Then, at step 2910, the client obtains a set of pre-rendered pieces (e.g., a first corner piece 2610, a second corner piece 2612, a third corner piece 2614, a fourth corner piece 2615, and a pointing piece 2622 as shown in FIG. 26A) for the fixed portions of the boundary of the HTML window that will subsequently be overlaid onto the map image. At step 2915, the client connects these pre-rendered pieces to create the non-fixed portions of the boundaries of the information window. For example, the exterior boundary of the information window may be determined by generating a line between the pre-rendered pieces, such as, e.g., via connected line 2620, as shown in FIG. 26A. Then, at step 2920, as discussed below, the client determines and obtains a set of pre-rendered pieces that will subsequently be overlaid onto the map image to generate the fixed portion of the information window shadow image. At step 2922, as also discussed below, the client connects the pre-rendered pieces to fill in the rest of the information window shadow image.

Figure 26B:
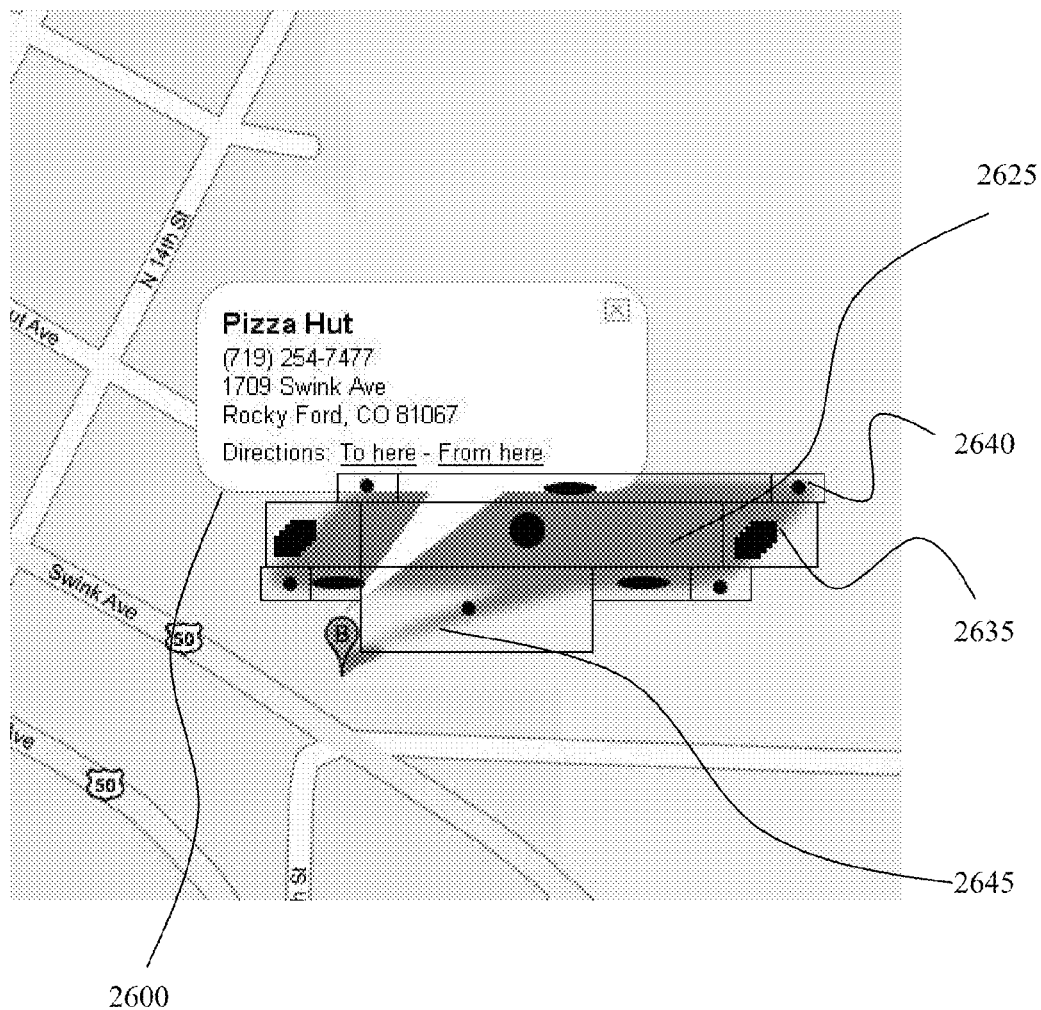
FIG. 26B depicts additional exemplary details of an information window according to aspects of the present invention.

FIG. 26B shows an example of an information window shadow 2625 (also shown as element 855 in FIGS. 8 and 27) for use with an information window, along with its elementary components. The shadow image 2625 may be dynamically created such that it corresponds proportionately to the dynamic size of the information window 2600 created as described above. An exemplary method for dynamically creating a shadow image 2625 may proceed as follows, with reference to FIG. 26B. The height of the shadow image 2625 may be set as one-half the height of the information window 2600. As shown in FIG. 26B, the size of HTML table shadow 2625 is determined such that it can contain the shadow at half the height, including the blurred outline of the shadow (if present). The angled vertical lines of the information window (e.g., line 2635) may be created by skewing them at a predetermined angle, e.g., a 45-degree angle, to match the isometric view. For example, off-set line 2635 is set at a 45-degree angle. These angled lines may be created, either at the client or at the server, by using a clipping rectangle to display only the required portion of a pre-rendered angled shadow line. The client also determines a set of pre-rendered pieces for the corners of the shadow image and the pointing piece. In FIG. 26B, for example, an information window shadow box corner piece 2640 and an information window shadow pointing piece 2645 may be obtained, either from a server or locally. After determining the boundaries of the shadow image based on the size of the information window 2600, and after obtaining and clipping the appropriate pre-rendered pieces, then the rest of the connecting lines may be determined and drawn in.

The shadow image may also be filled to create a shadow-like appearance, such as shown in FIG. 26B. To further enhance the shadow-like appearance, the portion of the shadow image closest to the bottom of the information window may be the darkest and/or sharpest, while gradually lightening and/or blurring the fill the farther away the portion of the shadow image is located from the bottom of the information window.

Referring back to FIG. 29, at step 2925, the client overlays the shadow onto the map image. Finally, at step 2930, the client overlays the information window onto the map image. As can be seen from the examples in FIGS. 8, 26A, 26B and 27, this method produces an information window that, when displayed on a digital map along with its shadow, appears to be three-dimensional in its entirety. Optionally, the three-dimensional appearance may be enhanced by placing multiple tile windows such that information windows are placed starting from North to South, such that a sense of depth is also provided. Other options are available, such as placing the information windows from East to West. This method may also be used when placing more than one marker on the map.

Figure 25:
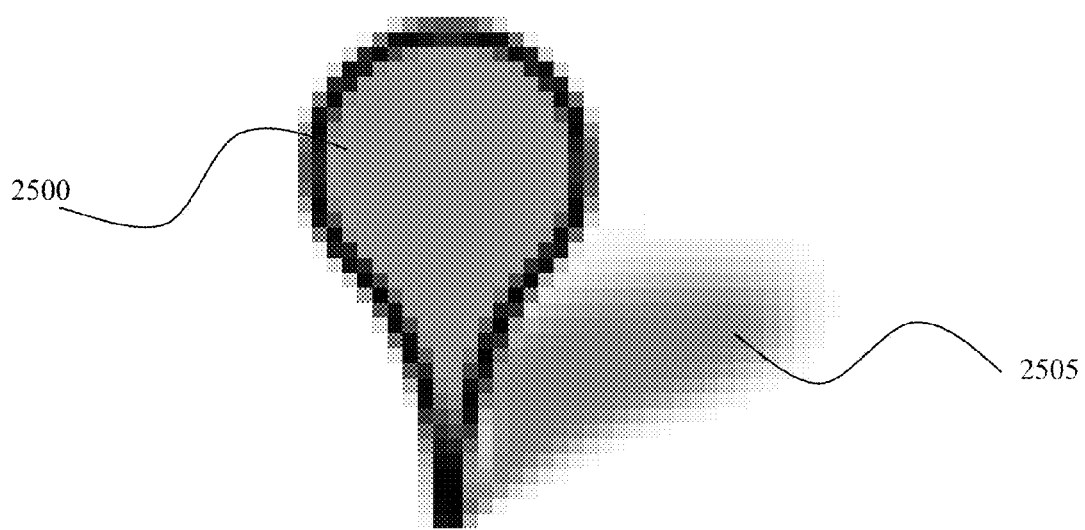
FIG. 25 depicts exemplary details of a location marker according to aspects of the present invention.

Referring to FIG. 25, a similar technique may be employed to generate the angled shadow 2505 for a location marker 2500.

Figure 30:
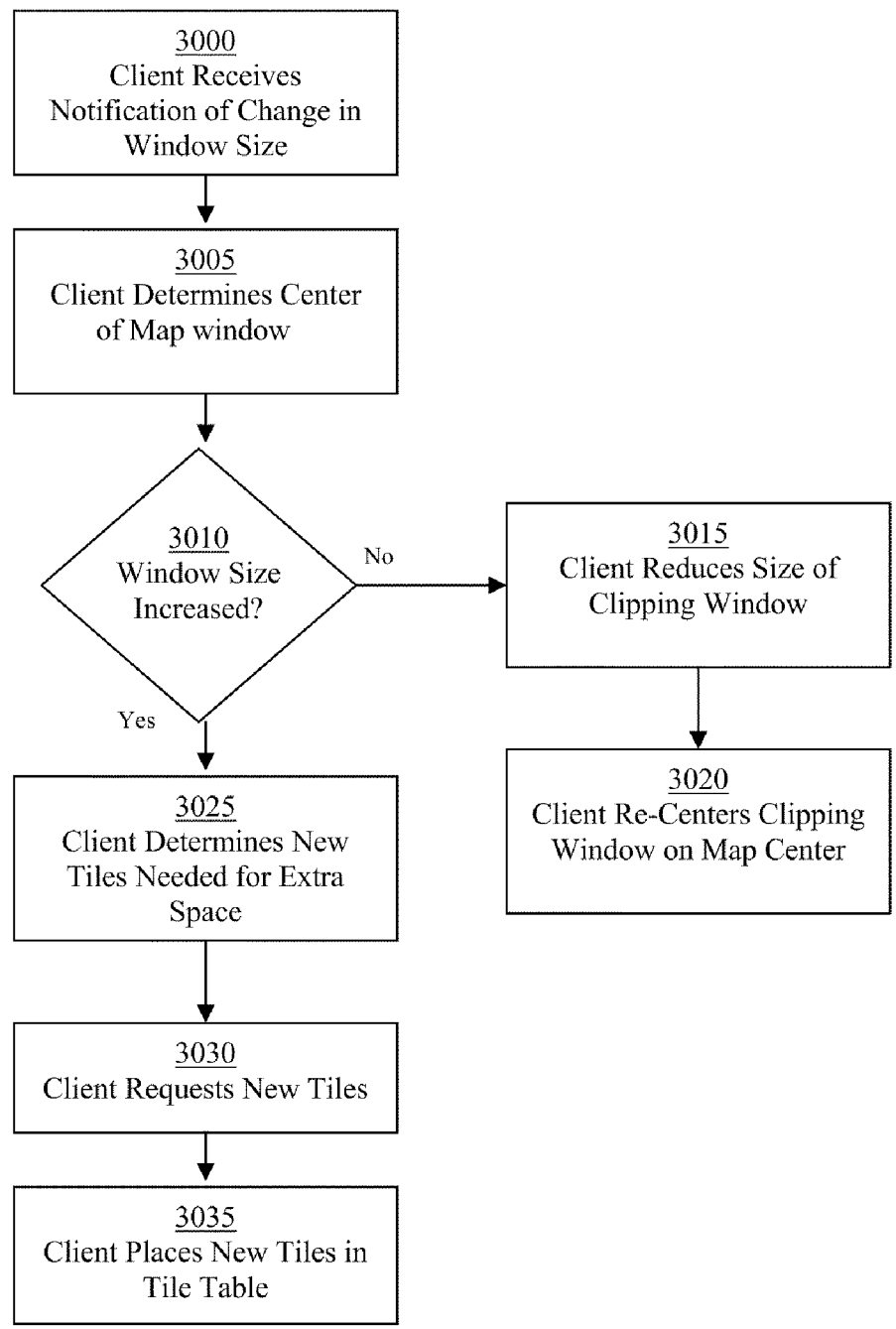
FIG. 30 depicts an exemplary flow chart for resizing a map image display window according to one embodiment of the present invention.

FIG. 30 depicts an exemplary flow chart for resizing a map image display window according to one embodiment of the present invention. At step 3000, the client receives a notification of a change in the map image display window size (e.g., as a result of a window resizing action by the user). Then, at step 3005, the client determines the center of the map image window. Next, at step 3010, the client determines whether the window size has been increased. If so, at step 3025, the client determines the identity of any new map tiles that may be required to fill the new additional space, and at step 3030 the client requests these new tiles, either from its local cache or from a remote server. At step 3035, the client places the new tiles in a tile table array and displays the new map image. Alternatively, if at step 3010 the client determines that the window size has been decreased, then at step 3015 the client proportionately reduces the size of the clipping shape window. Finally, at step 3020, the client re-centers the clipping shape window on the map image center.

High-Resolution Printing

Figure 31:
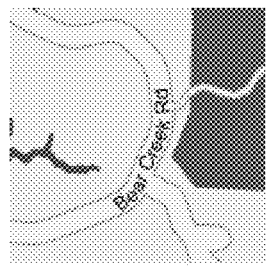
FIG. 31 depicts an exemplary set of map image tiles of different resolutions for high-quality printing of map images according to one embodiment of the present invention.
Figure 31:
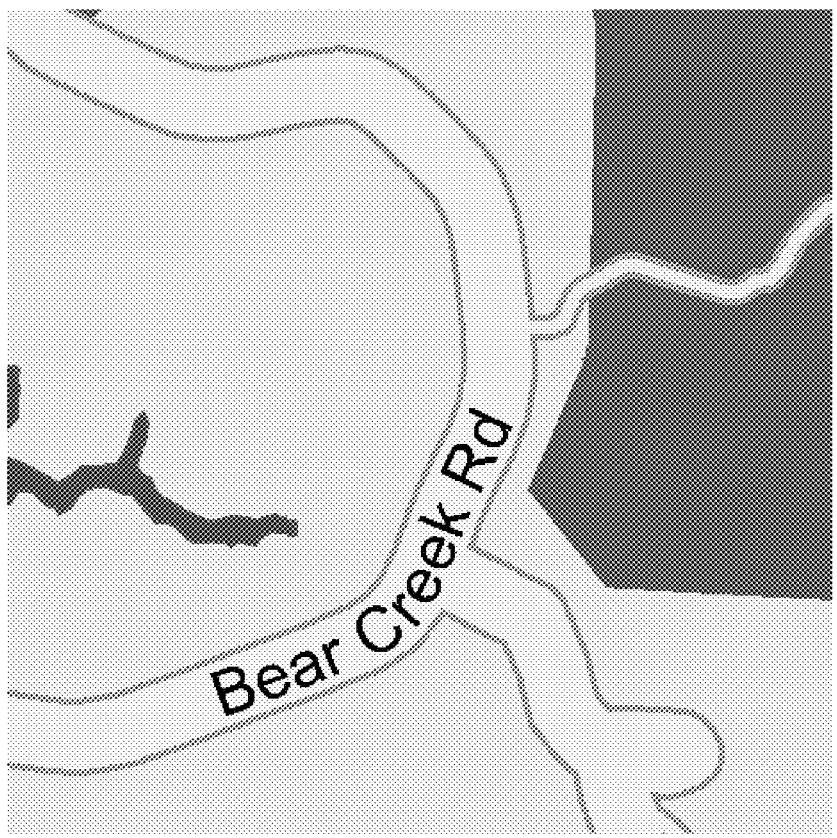
Figure 31:
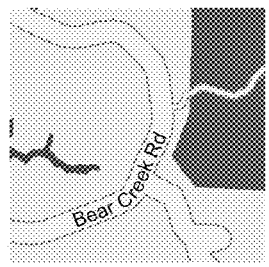

Printing a map view from conventional web map sites generally produces poor output, as the map views are presented in screen resolution, which is often an order of magnitude lower than that of modern printers. Some host technologies, however (including DHTML as used in one embodiment), facilitate the assembly of map views using map tiles at a resolution suitable for printing. Thus, to achieve higher-quality hardcopies of map images in one embodiment, map views can be re-assembled using print resolution tiles. Because one embodiment uses HTML IMG elements to place tiles in the tile grid, two images of the same map tile, with one (e.g., screen_tile.gif) at size 128×128 pixels, and the other (e.g., print_tile.gif) of size 512×512 pixels may be used for display and printing purposes, respectively. FIG. 31 depicts an exemplary set of map image tiles of different resolutions for high-quality printing of map images according to one embodiment of the present invention. Persons skilled in the art will note that the third image shown in FIG. 31 appears as a high-resolution version of the first image. Using this observation, in response to a print request from a user, the current map view may be re-assembled using print-resolution tiles to achieve a superior print output.

Software and/or hardware for implementing the steps of the flowcharts described and illustrated in this document may be implemented on the computing device 503 and/or any combination with the servers 510, 515, and 520 or other computing devices or servers that are not shown, such as by an Internet service provider server that is connected between the computing device 503 and the network 505. Moreover, the blocks illustrated may be performed in different orders and are not required to be performed in the exact sequence illustrated. Furthermore, non-dependent acts may be implemented in parallel.

It will also be apparent to one of ordinary skill in the art that aspects of embodiments, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of certain aspects of the embodiments were described without reference to the specific software code—it being understood that one of ordinary skill in the art would be able to design software and control hardware to implement the aspects based on the description herein. Further, certain portions of embodiments may be implemented as "logic" that performs one or more functions. This logic may include hardware, such as an application specific integrated circuit or a field programmable gate array, software, or a combination of hardware and software.

Certain exemplary embodiments have been described and shown in the accompanying drawings. It is to be understood, however, that such embodiments are merely illustrative and not restrictive. The disclosure should not be limited to the specific constructions and arrangements explicitly disclosed because various other modifications will occur to those ordinarily skilled in the art.

What is claimed is:

1. A method of recording transactions involving viewing a map, the method comprising:
   determining a billing point grid relative to a map;
   displaying a first map view containing a first billing point from the billing point grid;
   receiving user input requesting a new map view;
   displaying the new map view;
   responsive to a new billing point from the billing point grid entering the new map view, triggering a transaction; and
   collecting transaction information.

2. The method of claim 1, wherein the billing points of the billing point grid are not visible to the user.

3. The method of claim 1, wherein billing points of the billing point grid are defined in the horizontal direction at an interval equal to a width in pixels of the first map view and in the vertical direction at an interval equal to a height in pixels of the first map view.

4. The method of claim 3, wherein the first billing point is positioned at a center of the first map view.

5. The method of claim 1, wherein receiving user input requesting a new map view comprises receiving a user-initiated panning operation.

6. A computer-readable medium encoded with instructions, that when executed by a processor, cause the processor to record transactions involving viewing a map, the instructions comprising instructions for:
   determining a billing point grid relative to a map;
   displaying a first map view containing a first billing point from the billing point grid;
   receiving user input requesting a new map view;
   displaying the new map view;
   responsive to a new billing point from the billing point grid entering the new map view, triggering a transaction; and
   collecting transaction information.

7. The computer-readable medium of claim 6, wherein the billing points of the billing point grid are not visible to the user.

8. The computer-readable medium of claim 6, wherein billing points of the billing point grid are defined in the horizontal direction at an interval equal to a width in pixels of the first map view and in the vertical direction at an interval equal to a height in pixels of the first map view.

9. The computer-readable medium of claim 8, wherein the first billing point is positioned at a center of the first map view.

10. The computer-readable medium of claim 6, wherein receiving user input requesting a new map view comprises receiving a user-initiated panning operation.

* * * * *